(12) United States Patent
Uchiyama

(10) Patent No.: US 8,984,806 B2
(45) Date of Patent: Mar. 24, 2015

(54) PLANT CULTIVATION APPARATUS

(76) Inventor: Hisakazu Uchiyama, Hamamatu (JP)

( * ) Notice: Subject to any disclaimer, the term of this patent is extended or adjusted under 35 U.S.C. 154(b) by 601 days.

(21) Appl. No.: 12/934,648

(22) PCT Filed: Mar. 26, 2009

(86) PCT No.: PCT/JP2009/056204
§ 371 (c)(1),
(2), (4) Date: Feb. 24, 2011

(87) PCT Pub. No.: WO2009/119778
PCT Pub. Date: Oct. 1, 2009

(65) Prior Publication Data
US 2011/0192082 A1    Aug. 11, 2011

(30) Foreign Application Priority Data

Mar. 26, 2008 (JP) ................. 2008-082252
Dec. 1, 2008 (JP) ................. 2008-306911

(51) Int. Cl.
*A01G 9/24* (2006.01)
*A01G 31/06* (2006.01)

(52) U.S. Cl.
CPC . *A01G 9/24* (2013.01); *A01G 31/06* (2013.01)
USPC ............................................. 47/17; 47/66.6

(58) Field of Classification Search
CPC ........... A01G 9/24; A01G 9/246; A01G 9/14; A01G 31/02
USPC ....... 47/17, 39, 59 R, 60, 66.6, 18, 19.1, 19.2
See application file for complete search history.

(56) References Cited

U.S. PATENT DOCUMENTS

| | | | |
|---|---|---|---|
| 7,049,743 B2* | 5/2006 | Uchiyama | 313/512 |
| 2005/0268547 A1* | 12/2005 | Uchiyama | 47/64 |
| 2011/0192082 A1* | 8/2011 | Uchiyama | 47/66.6 |
| 2013/0000185 A1* | 1/2013 | Tanase et al. | 47/17 |

FOREIGN PATENT DOCUMENTS

| | | | | |
|---|---|---|---|---|
| JP | 62-21838 U | 2/1987 | | |
| JP | 62-275620 A | 11/1987 | | |
| JP | 63-187839 U | 12/1988 | | |
| JP | 63187839 U * | 12/1988 | | A01G 9/00 |
| JP | 64-80231 A | 3/1989 | | |
| JP | 8-242701 A | 9/1996 | | |
| JP | 10-136790 A | 5/1998 | | |
| JP | 2000106757 A * | 4/2000 | | A01G 9/00 |
| JP | 2001-346450 A | 12/2001 | | |
| JP | 2002-291331 A | 10/2002 | | |
| JP | 2006-75088 A | 3/2006 | | |

OTHER PUBLICATIONS

International Search Report for the Application No. PCT/JP2009/056204 mailed Jul. 7, 2009.

* cited by examiner

*Primary Examiner* — Monica Williams
(74) *Attorney, Agent, or Firm* — Cheng Law Group, PLLC

(57) ABSTRACT

The present invention discloses an apparatus to simplify an air supply path without damaging the merit of conventional culture apparatus. The apparatus is a culture apparatus which includes a row of a plurality of box-shaped containers for plant cultivation, and a row of lower stage containers arranged in the lower portion of the row, holding the upper stage container spaced as high as the height after growth of the plants to be cultivated. In each container, a support, a blocking film stretched between front and rear, right and left supports of the container are provided. In the one end of the rows of the containers, an air conditioner is arranged, and in another end, a turnaround chamber is provided.

7 Claims, 16 Drawing Sheets

FIG. 11B

PLANT CULTIVATION APPARATUS

FIELD OF THE INVENTION

This invention relates to a culture apparatus, for more details, to a culture apparatus which is suitable for industrial cultivation such as hydroponic cultivation etc., and can save an installation space.

DESCRIPTION OF BACKGROUND ART

The applicant has proposed previously a shelf including a plurality of stick shelf members, and a cultivation shelf including a plurality of slender cultivating floors laid slidably on the shelf in a direction intersecting the shelf member (refer to Patent Document 1). In the Patent Publication, it is further described that a heat insulation material and a heat radiating pipe are provided in the cultivating floor, and that a transparent wall made of synthetic resin for preventing a convection flow is also provided, which partitions the upper space of the cultivating floor from a surrounding area (refer to FIG. 1 of the Patent Publication).

Further, the applicant has disclosed a cultivating shelf of stacking method, in which units comprising a box-shaped container and supports standingly provided at four corners of an upper plane and a lower plane are stacked (refer to Patent Document 2). In such a cultivating shelf, it is made so that light emitting diodes arranged in the bottom face of an upper container give a light to plants cultivated in a lower container.

PRIOR ARTS DOCUMENTS

Patent Document 1: Published Japanese Patent Application NO. H08-242701
Patent Document 1: Published Japanese Patent Application NO. H10-136790

DISCLOSURE OF INVENTION

The cultivating shelf of Patent Document 1 is that in which a cultivating floor generally arranged planarly on the ground is arranged in three dimensions on a shelf, thereby being the advantage of saving space to a large extent. Moreover, it is easy to maintain air temperature of the upper part of a container constant by a shielding film continuing lengthwise in front and in rear of the container. However, since the cultivating floor serving as a cultivating unit is long, the work to load on a shelf or to unload from the shelf for harvesting is troublesome. On the other hand, in the cultivating shelf of Patent Document 2, since a plurality of comparatively short containers is arranged, it is easy to take out a certain container only, and also to replace it with a separate container. However, since in order to send in air air-conditioned by an air conditioner, it becomes necessary to provide an individual air supply pipe, and to pass the air supply pipe through interior of the support, piping paths become complicated.

The present invention is directed to make an air supply path simple without impairing the merit of the cultivating shelf of Patent Document 2.
Further, the present invention is directed to provide a culture apparatus which can perform efficiently the loading and unloading of containers for cultivation. Further, the present invention is directed to provide a culture apparatus which can cultivate easily a small plant.

The culture apparatus of the present invention comprises a plurality of box-shaped containers for plant cultivation arranged above and below, right and left, or back and forth, and a blocking wall provided (a) in front and in rear of the container, (b) right and left of the upper space of the container, or (c) right and left of the lower space of the container. The two of (a), (b), and (c) where the blocking wall is not provided are left open. The culture apparatus of the present invention further comprises an air supply apparatus which sends air-conditioned air to the upper space or the lower space of the container.

In such a culture apparatus, it is preferable that supports are provided in the four corners of either plane of the upper plane or the lower plane of the container or in the vicinity thereof, support receptacles which contact detachably the front end of the supports of other containers are provided in another plane, and that a plurality of containers can be stacked in three dimensions by sequentially stacking the supports receptacles or the supports of the upper container on the support receptacles or supports of the lower container. Moreover, the air supply apparatus may be a vertical duct continuing vertically or a horizontal duct continuing longitudinally over the plurality of containers. Moreover, the blocking wall may be provided in front and in rear of the container, and at the same time, the containers may be arranged right and left continuously.

The second embodiment of the present invention comprises
a plurality of box-shaped containers for plant cultivation arranged above and below, a blocking wall arranged separately to the container in front and in rear of the plurality of containers to be arranged, and an air supply apparatus which sends air-conditioned air to a space surrounded by the upper and the lower containers and the front and the rear blocking walls, in which supports are provided in the four corners of either plane of the upper plane or the lower plane of the container or in the vicinity thereof, support receptacles which contact detachably the front end of the supports of other containers are provided in other planes, and in which a plurality of containers can be stacked in three dimensions by sequentially stacking the supports receptacles or the supports of the upper container on the support receptacles or supports of the lower container.

In such a culture apparatus, it is preferable that a lifter which holds, and moves up and down the lowest stage containers, and a support mechanism which selectively takes a state to hold and a state to release the containers upper than the second stage from the lowest stage are equipped. Further, it is preferable that a horizontal shift mechanism to shift horizontally the lowest stage containers while holding the containers upper than the second stage from the lowest stage is equipped. Moreover, in any of the above culture apparatuses, it can be made so that the container is equipped with a shelf plate and a compact container which can be detachably attached to the lower face of the shelf plate.

The third embodiment of the present invention comprises a container, a blocking wall provided in the side and the top face of the container, and an air supply apparatus which sends air-conditioned air to a space between the container and the blocking wall. The fourth embodiment of the present invention comprises a shelf plate having translucency, a compact container which can be detachably attached to the lower face of the shelf plate, and a lighting fixture which illuminates interior of the compact container from above the shelf plate. In this case, it is preferable that a plurality of compact containers is attached to the shelf plate, shelf covers surrounding the compact containers are detachably and air-tightly attached to the shelf plate from beneath.

The fifth embodiment of the present invention comprises a fixed shelf in which at least one pair of ducts partitioned back and forth, above and below, or right and left by a blocking wall, a container for plant cultivation provided at least interior of one duct among the one pair of ducts, and an air conditioning chamber which sends air-conditioned air to either of the duct among the one pair of the ducts, and retrieves the air from another duct.

In such a culture apparatus, it is preferable that a turn-around chamber which makes the one pair of ducts communicated mutually is provided in a plane opposite side to the plane where the air conditioning chamber is provided. Moreover, it is preferable that the containers are housed in the fixed shelf so as to be retrievable freely.

The sixth embodiment of the present invention comprises a plurality of box-shaped containers for plant cultivation arranged above and below, right and left, or back and forth, a blocking wall which blocks each container from a surrounding space, a lighting fixture which illuminates, and at the same time, heats interior of the container and interior of a space surrounded by the blocking wall, and a cooling means which cools interior of the container, interior of the space surrounded by the partitioning wall.

In such a culture apparatus, it is preferable that a temperature regulation means is further provided, which regulates the degree of cooling by the cooling means according to the temperature of interior of the container, interior of the space surrounded by the blocking wall or the lighting fixture. Moreover, the cooling means can be made as the air supply apparatus which sends air-conditioned air to interior of the container, interior the space surrounded by the blocking wall, or the lighting fixture. Moreover, the cooling means can be made so that it is equipped with a piping which sends a cooling medium for cooling the containers, the blocking walls, and the lighting fixtures. Further, it is preferable that the lighting fixture is equipped with a heat radiation plate and a translucent plate arranged spaced apart mutually, a sealing frame which plugs the gap of the perimeter of those heat radiation plates so as to be roughly air-tight, and a light emitting body of heat generating property arranged so as to emit light toward the translucent plate on the heat radiation plate, and in which the cooling means cools at least the heat radiating plate. In this case, it is preferable that the light emitting body is that which emits ultraviolet rays, the translucent plate is an ultraviolet transmitting material, and a translucent plate outside of which is coated with a fluorescence agent which emits light by ultraviolet rays is detachably provided.

Further, it is preferable that the blocking wall is equipped with thermal insulation property. Further, it is preferable that the container is housed in the space surrounded by the blocking wall so as to be retrievable freely. Moreover, it is preferable that a shifting apparatus to shift the container within a space surrounded by the blocking wall is further provided, and in which an inlet port to feed the container and an outlet port to take out the container are provided in the blocking wall.

In the culture apparatus of the present invention, the internal space and the external space are blocked by a blocking wall stretched in any of the two places of front and rear, right and left of the box-shaped container. Hence, air can be supplied from one place among the other opened two places, the air can be exhausted from the remaining one place. Accordingly, the upper space or the lower space of the container itself can be utilized as an air passage similarly to a duct. Hence, a piping facility can be simplified to a large extent, the piping facility may be not provided depending on the situation. Moreover, only the air in ducts is needed to be air-conditioned, which saves energy.

In such a culture apparatus, the supports are standingly provided in the four corners or in the vicinity of any one plane of the upper plane or lower plane of the container, support receptacles which contact detachably the front end of the supports of other containers are provided in other planes, and in which a plurality of containers can be stacked in three dimensions by sequentially stacking the supports or the support receptacles of the upper container on the supports or the support receptacles of the lower container. In this case, since it is possible to take out and to replace the cultivating units composed of the container and its four corners or the supports in the vicinity thereof, handling is easy. Further, that in which the cultivating unit is stacked can be used as a cultivating shelf as it is.

In the case that the air supply apparatus is a vertical duct continued vertically or a horizontal duct continuing longitudinally over the plurality of containers, it is possible to supply air-conditioned air to a plurality of containers arranged above and below or back and forth by only one vertical duct or horizontal duct. Accordingly, the piping facility can be further simplified. Moreover, by arranging each stacked containers sandwiching the vertical duct or the horizontal duct right and left, back and forth, one vertical duct or horizontal duct can be used for cultivating plants of many containers.

In the case that the blocking wall is provided in front and in rear of the container, and at the same time, the containers are arranged right and left continuously, the tubular space of upper side or lower side of many containers arranged right and left acts wholly as an air supply duct extending linearly, air-conditioned air passes through the inside thereof.

And it is used for the cultivation of plants of each container. Hence, if an air conditioner is coupled to the tubular space of the upper part of the container arranged in the end or middle way, other piping facilities are not necessary.

In the second embodiment of the culture apparatus of the present invention, containers can be stacked in multiple stages between the blocking walls arranged back and forth to make a culture apparatus (cultivating shelf). Hence, the fixed equipment is simple, furthermore, since it is not necessary to provide a blocking wall in the container itself, that which is simple is enough.

In such a culture apparatus, a lifter which holds, and moves up and down the lowest stage containers, and a support mechanism which selectively takes a state to hold and a state to release the containers upper than the second stage from the lowest stage are equipped. In this case, the lowest stage containers can be stacked while being added, the lowest stage containers can be unloaded while being taken out. Accordingly, the loading and unloading work of the containers can be performed efficiently. Further, the blocking wall can be fixed to be integrated with a building also.

In the case that a horizontal shift mechanism to shift horizontally the lowest stage containers while holding the containers upper than the second stage from the lowest stage is equipped, shifting the lowest stage containers is easy, making the loading and unloading work further efficient.

In the case that the container is equipped with a shelf plate and a compact container which can be detachably attached to the lower face of the shelf plate, a small plant and a large plant can be handled similarly allowing efficient cultivation.

In the third embodiment of the present invention, the container, the side of the blocking wall, and the top face blocking wall serve as a duct. Hence, when air-conditioned air is supplied from one open end, the air-conditioned air is supplied wholly in the containers. And, the temperature of the surrounded area can be set to a temperature different from the temperature of a building, energy consumption is small also.

Since the fourth embodiment of the present invention comprises a shelf plate having translucency, a compact container which can be detachably attached to the lower face of the shelf plate, and a lighting fixture which illuminates interior of the compact container from above the shelf plate, the light illuminated from the lighting fixture grows plants in the compact container through the shelf plate. Moreover, if the shelf plate is stacked, it becomes a cultivating shelf, thereby mass production is possible. Furthermore, removing the container only, it is possible to mount it on the shelf plate after sowing and raising of seedling.

In the fourth embodiment, in the case that a plurality of compact containers is attached to the shelf plate, and that shelf covers surrounding the compact containers are detachably and air-tightly attached to the shelf plate from beneath, the compact containers can be made to be air tight more securely, making it possible to use as a clean bench.

In the fifth embodiment of the present invention, since it is possible to make the blocking wall to be a supply duct and a return duct of air-conditioned air, the configuration of the shelf and the container is simple, furthermore, the upper part of the container can be used as a duct. Particularly, when the duct is arranged back and forth or right and left, the whole height of the culture apparatus can be made low. When one pair of ducts arranged back and forth or right and left is provided in multi stages above and below, the effect is further exerted.

In such a culture apparatus in which one pair of ducts is arranged back and forth, right and left, above and below, in the case that a turnaround chamber which makes the one pair of ducts communicated mutually is provided in a plane opposite side to the plane where the air conditioning chamber of fixed shelf is provided, it is possible to turn around the air sent from the air conditioner smoothly from the going side duct to the return duct. Further, in the case that containers are housed in the fixed shelf so as to be retrievable freely, it is easy to plant seeds and seedlings after taking out containers from the fixed shelf, to retrieving a harvest, or to steam-disinfect a soil in the container.

In the sixth embodiment of the present invention, since it is possible to heat (humidify) directly the containers, the blocking walls, or the cultivated plants, moreover, since it is possible to cool interior of the container, the space surrounded by the blocking wall, or the lighting fixtures by the cooling means, requiring less energy consumption compared with the case that a factory is wholly warmed up or cooled. Particularly, in the cultivation period in a cold district or in a winter season, heating expense can be saved. Further, every cultivating space surrounded by the blocking wall can be set to a suitable mutually different temperature.

In such a culture apparatus, in the case that a temperature regulation means is further provided, which regulates the degree of cooling by the cooling means according to the temperature of interior of the container, interior of the space surrounded by the blocking wall or the lighting fixture, it is possible to set the cultivating environment to a suitable temperature automatically. Moreover, in the case that the cooling means is the air supply apparatus which sends air-conditioned air to interior of the container, the space surrounded by the blocking wall, or the lighting fixture, there is no danger of water leakage, the temperature control of the culture apparatus equipped with many containers becomes easy. On the other hand, in the case that the cooling means is equipped with a piping which sends a cooling medium for cooling the containers, the blocking walls, and the lighting fixtures, the temperature control becomes further easy.

In the case that the lighting fixture is equipped with a heat radiation plate and a translucent plate arranged spaced apart mutually, a sealing frame which plugs the gap of the perimeter of those heat radiation plates and the translucent plates so as to be roughly air-tight, and a light emitting body of heat generating property arranged so as to emit light toward the translucent plate on the heat radiation plate, and in which the cooling means cools at least the heat radiating plate, the lighting fixture can be protected from the high temperatures and high humidity of plant cultivation, elongating the service life of the lighting fixture. In the case that the light emitting body is that which emits ultraviolet rays, the translucent plate is an ultraviolet transmitting material, and a translucent plate the outside of which is coated with a fluorescence agent which emits light by ultraviolet rays is detachably provided, by replacing the light emitting plate only, a light of suitable color can be supplied. Further, if the fluorescent coating deteriorates, only needed to do is to replace the light emitting plate.

Further, in the case that the blocking wall is equipped with thermal insulation property, energy saving effect is further high. Further, in the case that the container is housed in the space surrounded by the blocking wall so as to be retrievable freely, planting, harvesting of plants is easy. A shifting apparatus to shift the container within a space surrounded by the blocking wall is further provided, since the container shifts in the culture apparatus, seedlings of plants are let in from an inlet port and is made to shift to an outlet port, it is possible to take out the plants grown in the period being shifted.

BRIEF DESCRIPTION OF THE DRAWINGS

FIG. 11a and FIG. 11b are respectively a front elevation view and a plain view showing further the other embodiment of the culture apparatus of the present invention;

FIG. 18b is a cross sectional view of XX line of FIG. 18a;

BEST MODE FOR CARRYING OUT THE INVENTION

Hereinafter, the embodiments of the present invention will be described referencing the drawings.

Figure 1:
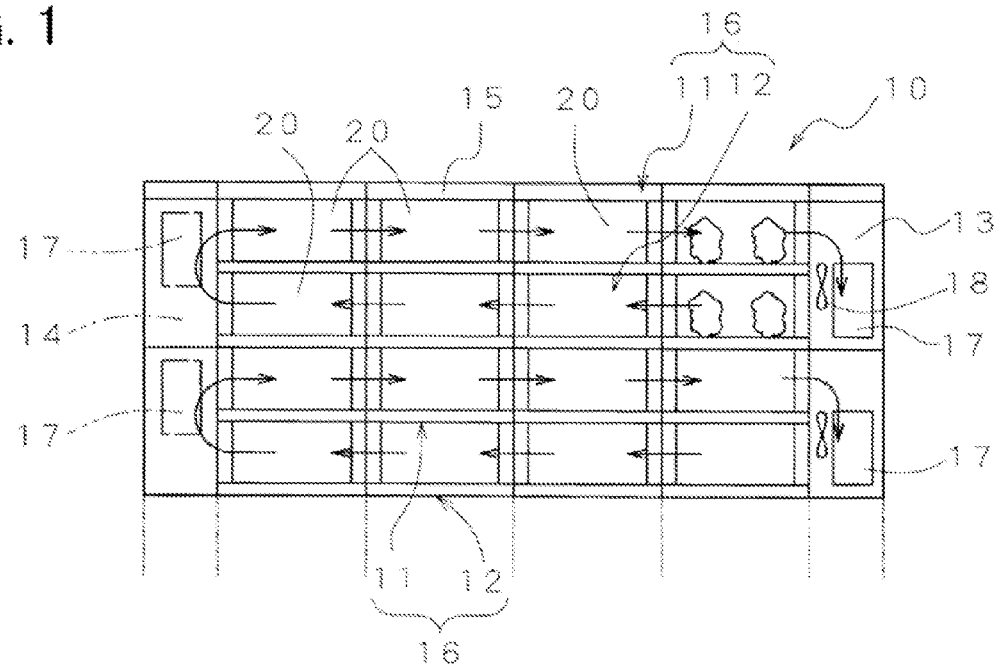
FIG. 1 is a front elevation view showing an embodiment of the culture apparatus of the present invention.

A culture apparatus 10 shown in FIG. 1 is made to be a cultivating shelf including rows 11, 12 of a cultivating unit 20 stacked above and below in a plurality of stages, an air conditioning chamber 13 arranged in one end portion of these rows 11, 12, a turnaround chamber 14 or a turnaround duct arranged in another end portion, and a cover 15 covering the upper plane of the upper most row 12. In this embodiment, the upper row 11 and the lower row 12 are made to be one set of upper and lower two stages, by every set 16, the air conditioning chamber 13 and the turnaround chamber 14 are divided. In the air conditioning chamber 13, the heat exchanger (air conditioner) 17 is arranged, the air of which the temperature and the component are suitably controlled is sent to the right end of the cultivating unit 20. As the control of the component, the contained amount of carbon dioxide and oxygen can be cited.

The row 12 is that in which the cultivating units 20 are lined up horizontally. The cultivating unit 20 comprises a shallow dish like container (tray) 21, two front supports 22 and two rear supports 23 standing up from the four corners of the container, a blocking film 24 stretched respectively between the two front supports 22 and two rear supports 23, and a lighting fixture 26 arranged in the lower plane of the container 21. The blocking film 24 is not stretched between the front and rear supports. Hence, the right and left and upper side of the cultivating unit 20 are left open. The blocking film 24 is preferable to be attached to the supports 22, 23 or later described frame 28 with adhesives etc. so as to be capable of maintaining air-tightness as much as possible. The blocking film 24 may be fabricated using fasteners etc. so as to be freely openable and closable.

In this embodiment, the container 21 is equipped with a frame 28 composed of a front and rear, right and left frame plate 27, and a bottom plate 29 fixed at the middle point of vertical direction in the interior of the frame 28. The lower end of the support 23 is fixed to the upper face of the bottom plate 29 in the interior of the frame plate 28. In the front and the rear frame plate 28, a notch 30 for inserting the claw of a forklift is formed. The container 21 is made of synthetic resin, and can be manufactured by integral molding, welding of metal plate etc. In the case of synthetic resin, it can also be integral formed with the supports 22, 23.

For the supports 22, 23, a commercially available angle material, or that in which a metal plate is folded to be L shape, further, a square pipe made of metal can be used. But it may be made of synthetic resin. The supports 22, 23 may be attached to the outside of the frame plate 28, but if attached to the inside thereof, the frame plate 28 of the container 21 of the upper stage can be put on the upper end of the supports 23, 23, allowing stable support.

As the blocking film 24, transparent synthetic resin film, for example, polyethylene film polypropylene film are used. It is not necessary to be transparent, but to be transparent makes it easy to observe the cultivation status. In addition, in place of the film, transparent or opaque plate made of synthetic resin or glass may be used. The film is preferable to be that which is of low gas permeability, low thermal conductivity, but it is enough to be capable of blocking air to some extent. If the film is made to be double layered provided with a clearance therebetween, gas blocking performance, thermal blocking performance will be enhanced.

Figure 2:
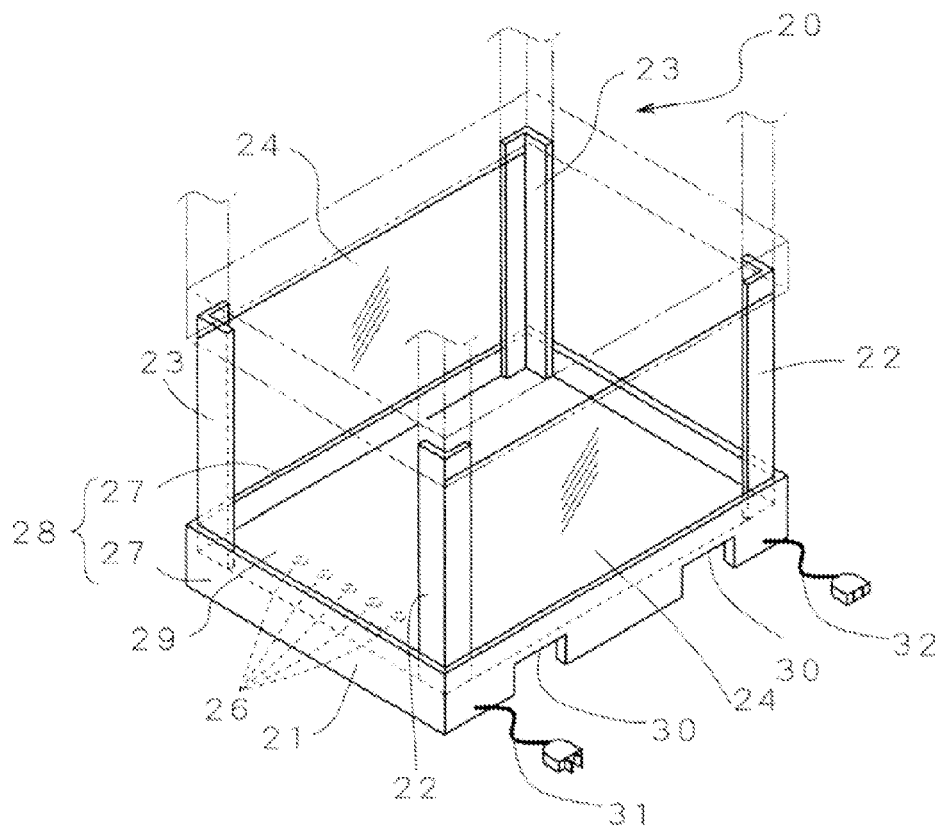
FIG. 2 is a perspective view of the cultivating unit used in the culture apparatus of FIG. 1.

When plants are cultivated by the above cultivating unit 20, a water-retaining mat, soil for cultivation are paved in the container 21, and seeds of vegetables, fruits, a class of flowers, a class of mushrooms or seedlings are planted and cultivated. Vegetable gelatin containing nutrition can be used also. In addition, though being not a precise classification, in the present specification, the class of mushrooms which performs spore reproduction is included in the plants. Aspersion and fertilizing to the container 21 is carried out through a supply pipe which supplies water in which nutritional elements are solved, as is conventionally done. In addition, a drain pipe to drain away excess water, a pipe to supply carbon dioxide may be provided. As a lighting fixture 26 provided in the lower plane of the container 21 is preferable to be light emitting diodes (refer to FIG. 3) aligned back and forth, right and left, but it may be fluorescent lamps, cold-cathode tubes etc. The reference numerals 31, 32 of FIG. 2 are electric cords to feed the lighting fixture 26. In the right and left electric cords 31, 32, male, female plugs are attached.

The cultivating unit 20 of FIG. 2 is made to be rows 11, 12 lined up right and left as FIG. 1, and these rows 11, 12 are stacked above and below. In an actual work, a longitudinal row is stacked first, the next longitudinal row may be stacked adjacently thereto. After they are stacked above and below, right and left, the air conditioning chamber 13 and the turnaround chamber 14 are arranged. In addition, a air conditioning duct in which the air conditioning chamber 13 is stacked above and below and a turnaround duct in which the turnaround chamber 14 is stacked above and below are fixed to a floor surface, the cultivating unit 20 may be stacked therebetween (refer to FIG. 8).

In the culture apparatus 10 configured as FIG. 1, the upper plane of each cultivating unit 20 is plugged by the bottom plate 29 of the container 21 of the upper stage cultivating unit 20. In the uppermost cultivating unit 20, it is covered by a cover 15. On the other hand, the right and left of the cultivating unit 20 is left open, each lateral row 12 becomes a tubular shape, composing as sort of a lateral duct. Hence, in a set 16 composed of the upper and the lower row 12, the air sent from the right end of the row 12 of the lower stage to the right end cultivating unit 20 reaches the left end cultivating unit 20 passing through the cultivating unit 20 of the row 12, and moves to the turnaround chamber 14. The air turned around at the turnaround chamber 14 enters into the left end cultivating unit 20 of the row 11 of the upper stage, reaches the right end cultivating unit 20 similarly as described above, and returns to the air conditioning chamber 13.

Similarly, in the third stage row and the fourth stage row from above, the air sent to the right end cultivating unit 20 of the row 11 of the lower stage (the fourth stage) reaches the left end cultivating unit 20, and is turned around at the turnaround chamber 14, reaches the right end cultivating unit 20 from the left end cultivating unit 20 of the row 12 of the upper stage (the third stage), and returns to the air conditioning chamber 13. About the rows 11, 12 of the cultivating unit located below such as the sets of the row of fifth stage and the row of sixth stage etc. the description is similar.

In this culture apparatus 10 as described above, the lateral duct is composed by whole of many cultivating units 20, air-conditioned air pass through inside thereof, thereby it is not necessary to manage the air temperature of a whole room. Hence, power for air conditioning can be saved to a large extent, saving energy. Further, it is possible to cultivate by flowing a different temperature air or a different carbon dioxide concentration air by every stage. Hence, a plurality of kinds of plant whose cultivating condition is different can be cultivated efficiently.

In the culture apparatus 10 of FIG. 1, the heat exchanger 17 is installed only in the right end air conditioning chamber 13, but as shown in the imaginary line, the heat exchanger 17 (air conditioner) may be arranged in the left end turnaround chamber 14, and each of the right and the left of them also may be made to be an air conditioning chamber. Moreover, in the culture apparatus 10 of FIG. 1, upper and lower two stages are made to be one set, but it is also possible that the right end of the second stage row and the third stage row from above may be mutually coupled by a duct or a turnaround chamber to form one set being upper and lower four stages, and also more stages than those can be made to be one set. In these cases, with the one heat exchanger 17, the temperature management of the row 12 of the cultivating unit 20 of four stages or more can be performed.

Figure 3:
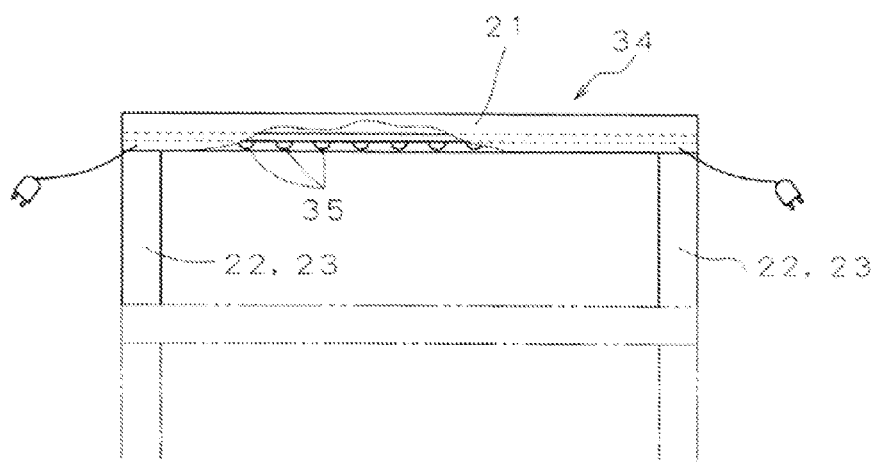
FIG. 3 is a front elevation view showing the other embodiment of cultivating unit related to the present invention.

Moreover, in the cultivating unit 20 of FIG. 2, the supports 22, 23 are standingly provided in the upper part of the container 21, but the supports 22, 23 can be provided in the lower side of the container 21 as the cultivating unit 34 shown in FIG. 3. In this case, the lower end of the support 22 is made to be supported by the upper plane of the container 21 of the lower stage.

The reference numeral 35 of FIG. 3 is many light emitting diodes arranged in the lower plane of the bottom plate 20 of the container 21. When the bottom plate 29 is made of metal such as aluminum, since these light emitting diodes 35 can be cooled by water in the container 21, there is a merit that durability is enhanced In the cultivating unit 20 of FIG. 20, the upper end of the support is made to be a free end, but a ceiling plate can be provided on the supports 22, 23. In this case, it is preferable to be a transparent plate which transmits the light of the light emitting diodes. But the light emitting diodes can be provided in the lower face of the ceiling plate, in which case, the ceiling plate is not necessary to be transparent. Further, a shelf plate may be provided, on which the unit may be laid (refer to FIG. 6). In this case, a lighting fixture such as light emitting diodes can be provided on the shelf.

Figure 4:
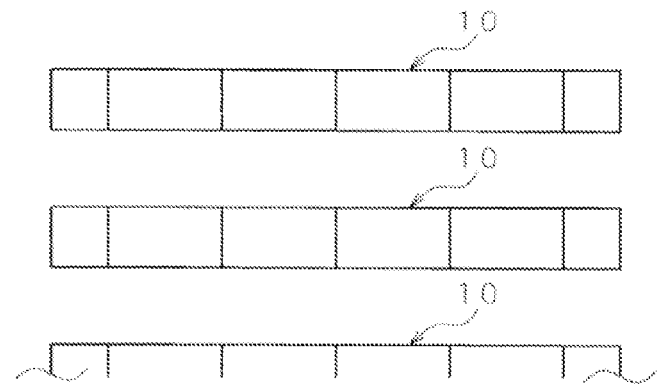
FIG. 4 is a plain view of the culture apparatus of FIG. 1.

In the cultivating unit 20 shown in FIG. 1, for example as shown in the plane view of FIG. 4, a plurality of the devices is arranged so as to be spaced with a clearance 36 which serves as a walkway in a building. Thereby, many plants can be cultivated efficiently saving the space. The culture apparatus 20 in which seeds and seedlings are planted are stacked sequentially from the lower stage by a forklift etc. as shown in FIG. 1. Moreover, when harvesting grown plants, they may be sequentially unloaded from the upper stage.

Figure 5:
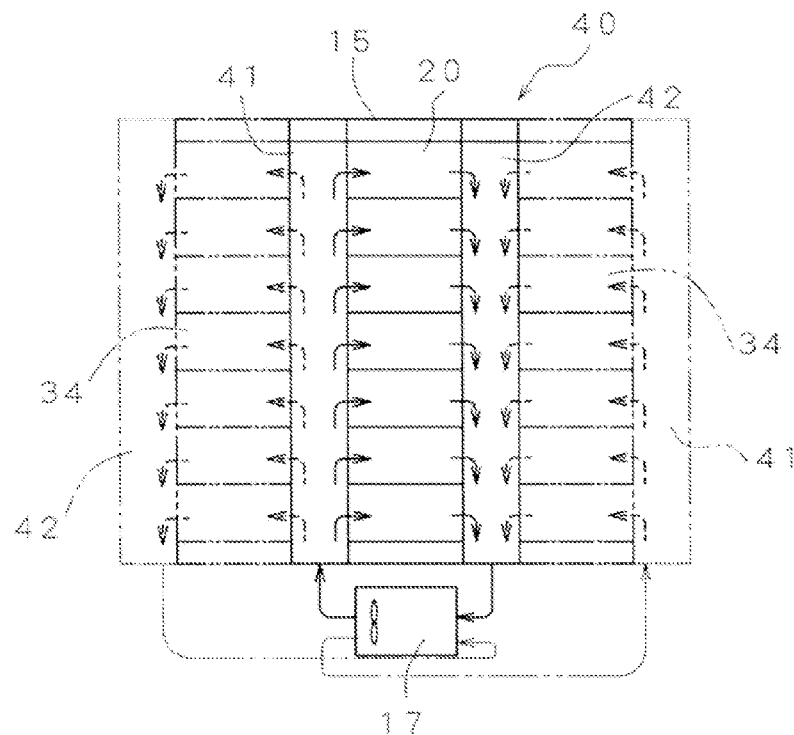
FIG. 5 is a front elevation view showing the other embodiment of the culture apparatus of the present invention.

In the culture apparatus 10 of FIG. 1, the many cultivating units 20 are arranged right and left to compose the row 12 lined up laterally, but as a culture apparatus 40 shown in FIG. 5, by only one cultivating unit 20 or only a few cultivating units, the row can be composed. In this case, since the thermal loading is low, it is possible to arrange a duct 41 for supply and a duct 42 for retrieving continuing vertically in right and left of the many stages can be arranged, and the temperature management can be done by one air conditioner (heat exchanger) interconnected between those ducts. When the thermal load is low and the capacity of the air conditioner is sufficient, as shown in the imaginary line, the duct 41 for supply and the duct 42 for retrieving can be made to be used commonly with the adjacent culture apparatus 40. In each case, the duct 42 for retrieving can be omitted. When interior of the building is air conditioned sufficiently, the duct for supply can be omitted also.

A culture apparatus 45 shown in FIG. 6 comprises a plurality stages of shelf plate 46, a fixed shelf 48 equipped with a shelf frame 47 consisting of horizontal frames and supports which support these shelf plates 46 spaced above and below, many cultivating units 49 arranged on the shelf plate 46 of the fixed shelf 48, and the air conditioning chamber 13 and the turnaround chamber 14 arranged in both sides of the fixed shelf 48. In this culture apparatus 45, it is not necessary for each cultivating unit 49 to support the upper stage cultivating unit 49. Hence, as shown in FIG. 7, it is sufficient only to attach a thin stick like supports 22, 23 upward in order to support the front and the rear blocking films 24 to the container 21. Moreover, when adopting a blocking wall (refer to reference numeral 61 of FIG. 10) in place of the film, supports are not needed to be provided. Hence, the cultivating unit 49 can be simply composed.

Further, since the cultivating unit 49 is merely laid on the shelf plate 46, it is easy to lay it on the fixed shelf 48 and to take out from the fixed shelf 48 by a forklift etc. and it is also easy to load, to unload, and to replace only the cultivating unit 49 in the middle way of height direction. And, the fundamental action is exerted similar to the culture apparatus 10 of FIG. 1 so that a lateral direction duct is composed by a plurality of cultivating units 49 arranged in a lateral direction, the air conditioned air from the air conditioner passes through the lower stage row 12 (or upper stage row 11), is turned around by the turnaround chamber 14, passes through the upper stage row 12 (or lower stage row 11), and returns to the original air conditioning chamber 13.

Figure 6:
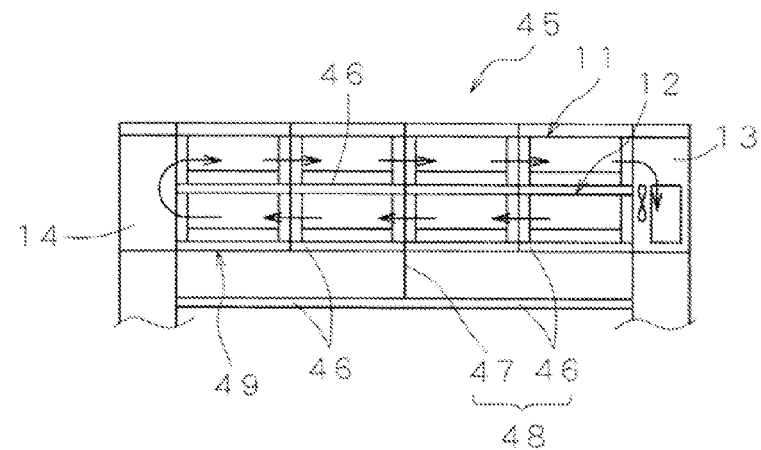
FIG. 6 is a front elevation view showing further the other embodiment of the culture apparatus of the present invention.
Figure 7:
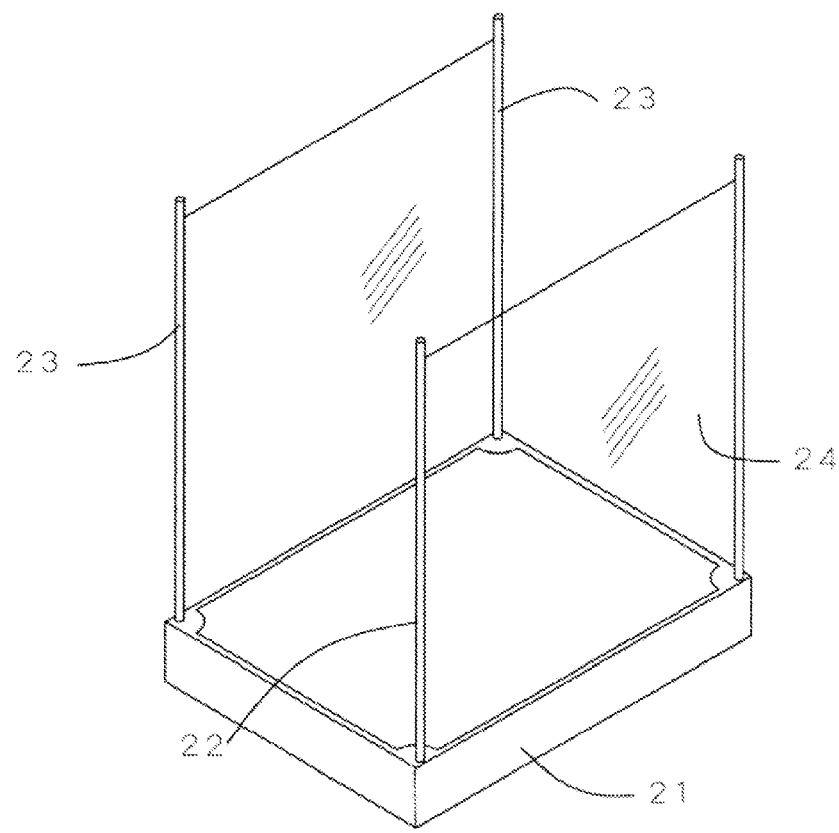
FIG. 7 is a perspective view showing further the other embodiment of cultivating unit related to the present invention.

In addition, the culture apparatus 45 equipped with the fixed shelf 48 shown in FIG. 6 also can be made into a culture apparatus provided with vertical direction ducts for supply and retrieving, in right and left of one or few cultivating units as shown in FIG. 5. When using a fixed shelf, a blocking plate in the rear side is provided in the fixed shelf, and the blocking sheet and the blocking plate in the rear side of the container can be omitted (refer to FIG. 15, FIG. 16). Further, a front side blocking sheet and a blocking plate can be also omitted by providing in the front side of the fixed shelf a double sliding door, a blocking plate made to be freely openable and closable with hinges of upper end or lower end.

Figure 8:
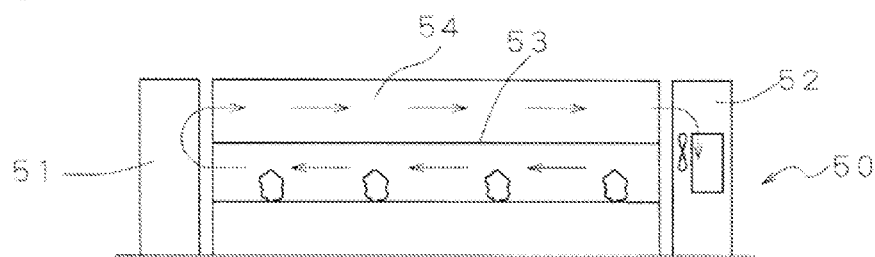
FIG. 8 is a front elevation view showing further the other embodiment of the culture apparatus of the present invention.

A culture apparatus 50 shown in FIG. 8 comprises a fixed chambers 51, 52 provided at the right end and the left end, a cultivating unit 53 detachably provided therebetween, and a return duct 54 provided thereon. And, among the right and the left fixed chambers 51, 52, in the right fixed chamber 52, an air conditioner is provided, the left fixed chamber is made to be a chamber for turnaround. In addition, the return duct 54 and the fixed chamber 51 for turnaround can be omitted. In this case, the air used for cooling etc. is exhausted to interior of a building as it is. The cultivation device of the present invention includes the case that such multi stages are not provided. Since in a culture apparatus 80 of FIG. 8, a cultivating unit 53 is detachably provided between the fixed chambers 51, 52 of the right and the left end, it is easy to replace the cultivating unit 53 by a forklift etc. Hence, it is suitable for a comparatively large cultivating unit.

Figure 9:
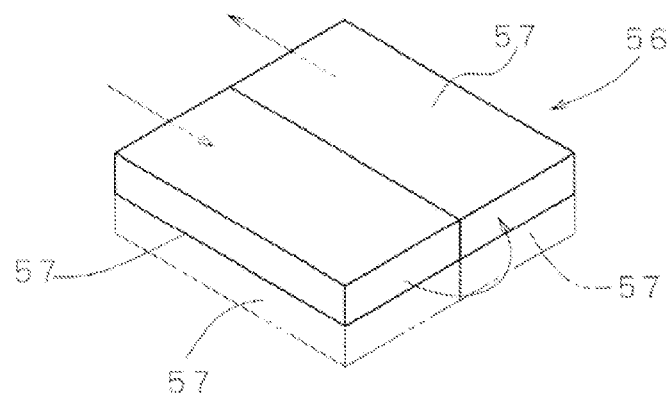
FIG. 9 is a perspective view showing further the other embodiment of the culture apparatus of the present invention.

In a cultivating unit 56 shown in FIG. 9, a cultivating unit 57 is arranged so as to be not vertical, but to be longitudinal. In addition, the one cultivating unit 57 can be made to be a return duct. The cultivating unit 56 of FIG. 9 can be lowered in the height. Hence, it is suitable for the case where there is a height limit. Moreover, as shown by the imaginary line, when stacked above and below, if the number of stages increases, the height does not increase so much.

Figure 10:
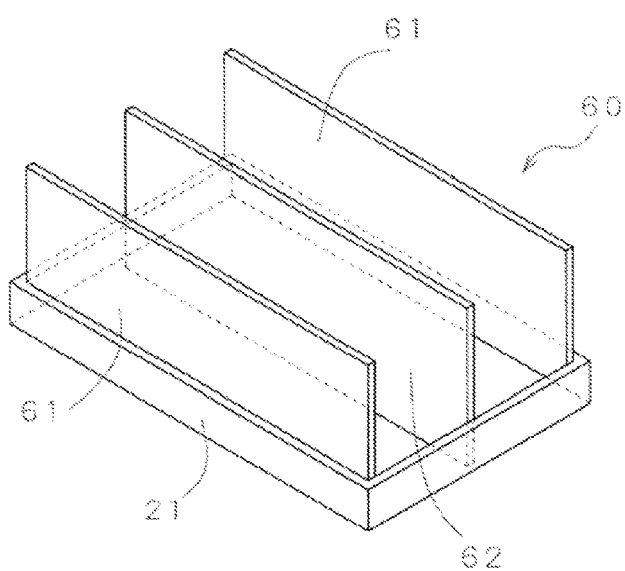
FIG. 10 is a perspective view showing further the other embodiment of the culture apparatus of the present invention.

In a culture apparatus 60 shown in FIG. 10, a plate like blocking wall 61 is provided in front and in rear of the container 21, further, a partitioning wall 62 to partition the container 21 back and forth is provided in the intermediate position thereof. This can flow air conditioned air and gas reciprocatingly by only being arranged in one row. Moreover, it is possible to cultivate different plants in front and in rear of the partitioning wall 62. As the portioning wall 62, similar to the blocking wall 61, other than plates of synthetic resin and glass, synthetic resin film can be adopted.

Figure 11A:
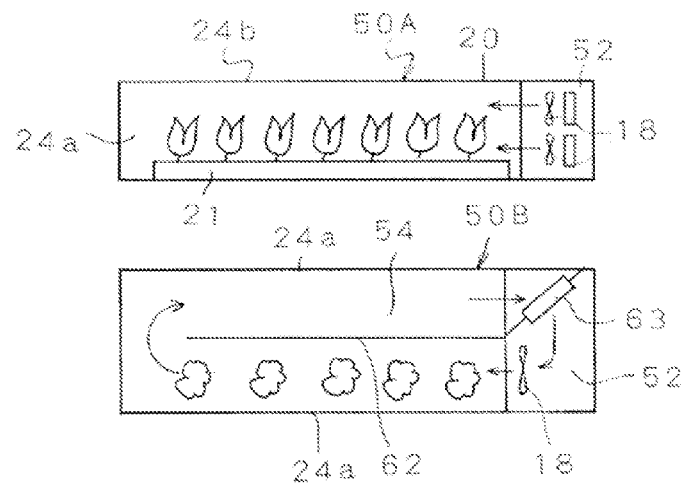

A culture apparatus 50A shown in FIG. 11 in an elevation view is equipped with one cultivating unit 20, two fans 18, and a heat exchanger. Without providing the heat exchanger, the fan 18 only may be provided. The cultivating unit 20 is that which is duct-like comprising the container 21, a blocking wall 24a provided back and forth, and a blocking wall 24b covering the top face thereof. However, the air conditioning chamber 52 or the air conditioner can be integrated with the cultivating unit 20. In each case, the cultivating unit 20 is preferable to be constructed so as to be freely attachable and removable to a building, in which case, planting and raising of seedling can be done in a separate place. Moreover, stacking the culture apparatus 20 above and below, or whole of the culture apparatus 50A which is the combination of the cultivating unit 20 and the air conditioning chamber 52 is stacked above and below, each of which can be made to be a cultivating shelf. Moreover, it is possible to line up back and forth. Further it is also possible to arrange above and below, back and forth.

A culture apparatus 50B shown in FIG. 11b in a plane view comprises a cultivating unit 60a and an air conditioning chamber 52 provided in one end thereof. The cultivating unit 60a is that in which a top face blocking wall is provided in the cultivating unit 60 of FIG. 10, thinned right and left, the front and the rear space being communicated mutually by notching one end of the partitioning wall 62. In the air conditioning chamber 52, a heat exchanger 63 and the fan 18 are provided. In this case also, the air conditioning chamber 52 can be fixed to a building, or integrated with the cultivating unit 60a. Among the front and rear space partitioned back and forth by the partitioning wall 62, plants to be cultivated are arranged in one space, another space is made to be a return duct 54. But, it is also possible to cultivate plants in the return duct 54 side.

Figure 12A:
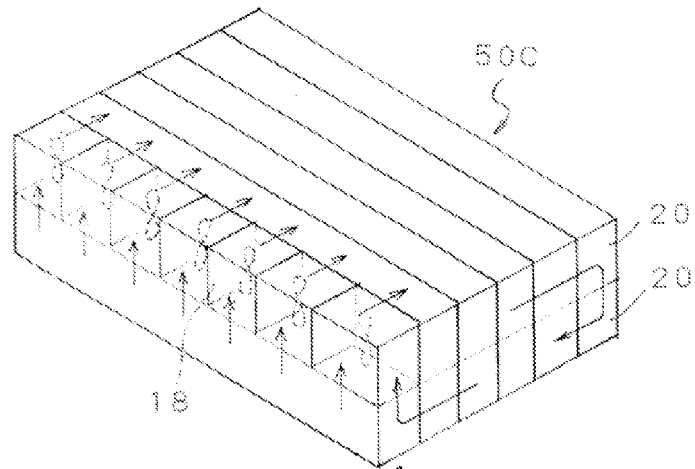
FIG. 12a and FIG. 12b are respectively a perspective view and a substantial perspective view showing further the other embodiment of the culture apparatus of the present invention.
Figure 12B:
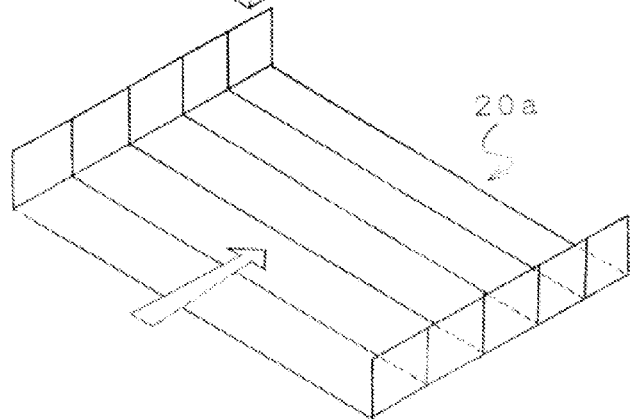

A culture apparatus 50C shown in FIG. 12a comprises a two-stage upper and lower cultivating unit 20 being long back and forth, right and left, and a plurality of fans 18 aligned right and left. A heat exchanger may be provided. Thereby, in the upper stage cultivating unit 20, air is made to flow forward, in the lower stage cultivating unit 20, air can be made to flow from rear to front. The lower stage can be made to be merely a return duct. This culture apparatus 50C can be constructed by stacking in two stages above and below the frame 20 shown in FIG. 12b. Whole of the frame 20 may be manufactured by combining the unit which is long right and left.

Figure 13:
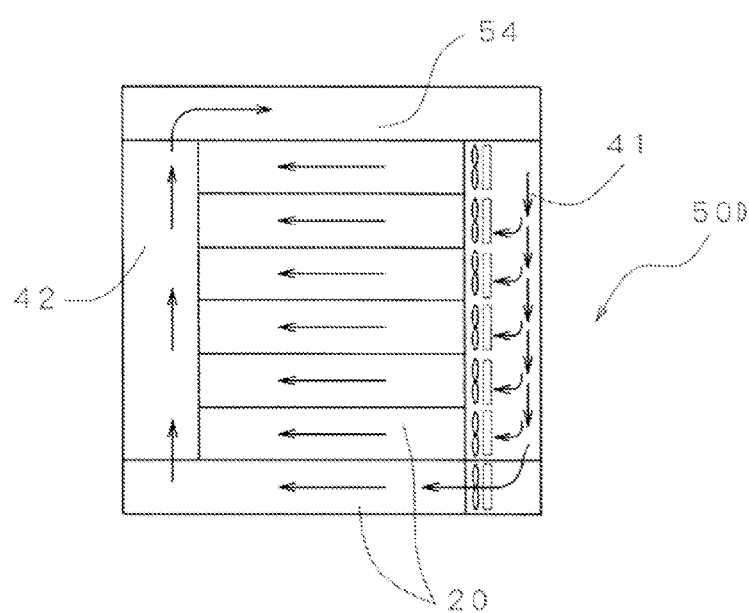
FIG. 13 is a plain view showing further the other embodiment of the culture apparatus of the present invention.

A culture apparatus 50D shown in FIG. 13 is that which is one stage configuration, where the many cultivating units 20 being in front and in rear are arranged back and forth. A common duct 41 for supply of many cultivating units 20 are arranged in one end, a common duct 42 for retrieving is arranged in another end, further, a return duct 54 which returns air from the duct 42 for retrieving to the duct 41 for supply is arranged in the outside in the same stage and in the same direction as the cultivating unit 20. In addition, this culture apparatus 50D can be, considered as an elevation view, regarded as a cultivating shelf in which the cultivating unit 20 is stacked vertically. In this case, it becomes about the same as the culture apparatus 40 of FIG. 5.

Figure 14:
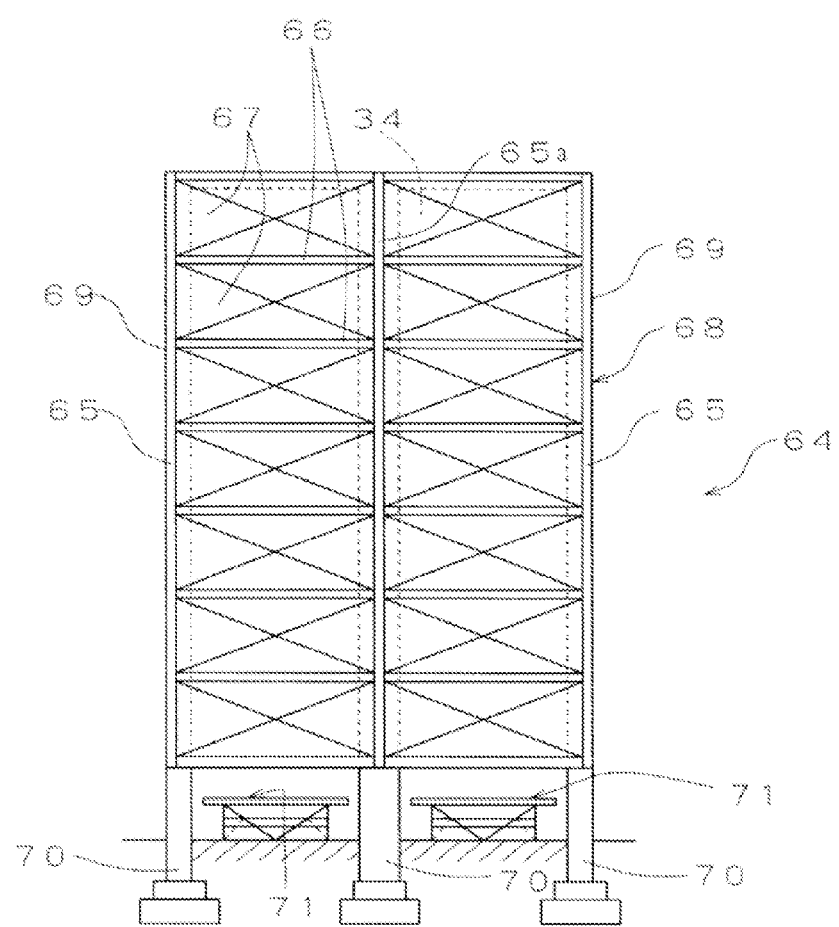
FIG. 14 is a front elevation view showing further the other embodiment of the culture apparatus of the present invention.

A culture apparatus 64 shown in FIG. 14 is equipped with a fixed frame (cultivating shelf) 68 composed of a corner pillar 65 provided in the corner of front and rear, right and left, an intermediate pillar 65a provided in the middle portion of front and rear, a bar or a beam 66 set over between these pillars 65, 65a, and a fixed panel 67 stretched on the front and the rear plane. The panel 67 of the front and the rear plane is that which does not let air through, and functions as a blocking wall. Hence, in the cultivating unit 34, it is not necessary to provide a blocking wall such as a blocking film. The inner surface of the panel 67 is made to be flat and smooth, making it possible to double as a vertical direction guide of the cultivating unit 34. However the guide can be provided separately. In this embodiment, the panel 69 is stretched on the right and the left plane also, having nearly a square tube like shape wholly. Each pillar 65, 65a is supported by a base leg 70. Between the base legs 70, a panel is not stretched. Further, on a floor FL surface between the base legs 70, a lifter 71 to lift up and to lift down the cultivating unit is arranged.

The corner pillar 65 and the intermediate pillar 66 of the fixed frame 68 can be constructed with, for example, square pipe made of steel, H-section steel etc., as a beam 67, an angle material etc. can be adopted. If required, a rod to receive a tensile force may be stretched over in an oblique direction. As the base leg 70, large-sized square pipe. H-section steel, reinforced concrete are adopted.

Figure 15:
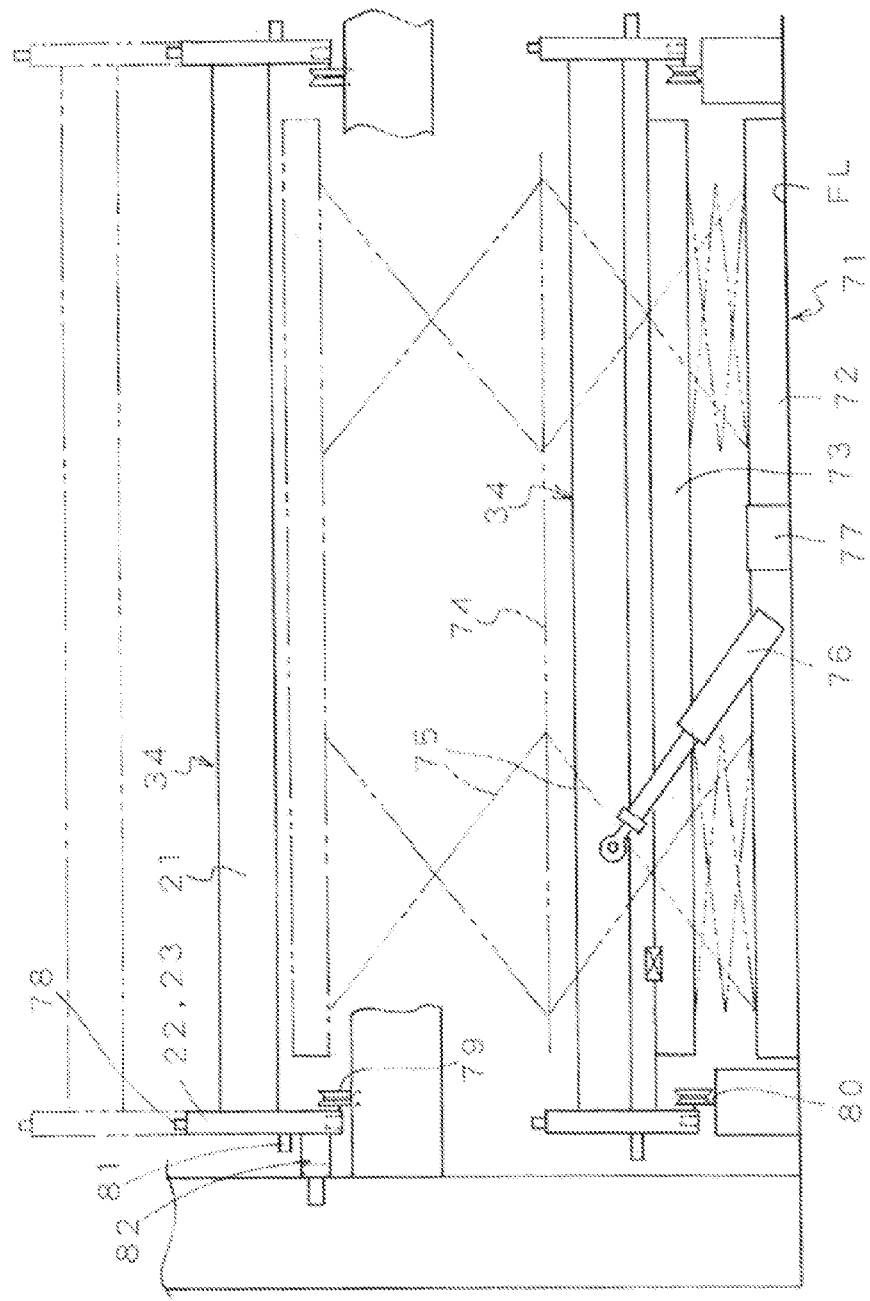
FIG. 15 is a front elevation view of the lifter used in the culture apparatus of the present invention.

For the lifter 71, as shown in FIG. 15, a table lifter etc. of X arm type is used. In this embodiment, in order to make a lifting stroke large, an intermediate beam 74 is provided between a base 72 and a table 73, lifting is carried out by a two-stage X-arm 75, as the drive source thereof, a hydraulic cylinder 76 is used. The reference numeral 77 is a hydraulic unit equipped with a hydraulic pump and a tank. In addition, in place of the X-arm type lifter, a lifter which is pushed up by a hydraulic cylinder from underneath etc. can be adopted.

The cultivating unit 34 is fundamentally same as the case of FIG. 2, but the intermediate portion of height direction of the supports 22, 23 are coupled to the four corners of the container 21. Thereby, the supports 22, 23 protrude to the upper and lower part of the container 21. The case in which the supports 22, 23 are thus protruded above and below, it can be used, as shown in FIG. 2, for the case other that plants are cultivated on the upper plane of the container, but also for the case that plants are cultivated in the lower plane side (refer to FIG. 13, FIG. 17) as described later. In the case also that the cultivating unit 34 is laid on a floor surface, a small container provided in the lower plane side can be held safely. Further, as shown in FIG. 3, when a lighting fixture such as the light emitting diode 35 is provided in the lower plane side, the lighting fixture can be held safely.

In the cultivating unit 34 of FIG. 5, a protrusion 78 coupled to the lower end of the supports of the upper side cultivating unit is provided in the upper end of the supports 22, 23, and in the lower end, a hole to fit the protrusion 78 is formed. When the supports 22, 23 are composed of a square pipe or a circular pipe, a shaft may be fitted to the upper end of the pipe and protruded. In addition, other than the case to be fitted, it can be supported by merely being laid.

Further, in the cultivating unit 34, a wheel 79 is free-rotatably provided in the lower end of the supports 22, 23. This wheel 79 is for running back and forth the cultivating unit 34 along a rail 80 fixed to the floor surface FL. It is also possible to couple a motor to give a rotative drive to the wheel 79. In this case, the cultivating unit 34 can be self-propelled, the cultivating unit 34 can be efficiently shifted.

Further, in each cultivating unit 34, an engaging protrusion 81 protruding right and left (laterally) is provided, and an engaging arm 82 which freely appears and disappears is provided in the corner pillar 65 of the fixed frame 78. The engaging protrusion 81 and the engaging arm 82 has a strength that can support the whole weight of the stacked cultivating unit 34. The engaging arm 82 is driven to appear and to disappear, for example, by the hydraulic cylinder. Thereby, the cultivating unit 34 can be supported while the engaging arm 82 appears, and can be shifted vertically while it disappears. Accordingly, by the cooperative work with the lifter 71, the cultivating unit 34 of the lowest stage can be taken out, and the new cultivating unit 34 can be inserted beneath the lowest stage cultivating unit 34.

When taking out the lowest stage cultivating unit 34, the table 73 of the lifter 71 is ascended to lift the lowest stage cultivating unit 34 a little together with the cultivating units upper than it. Thereby, the engaging of the engaging protrusion 81 and the engaging arm 82 is released. In this state, the engaging arm 82 is made to be pulled in. Then, the table 73 of the lifter 71 is descended as much as one stage. After the lowest stage cultivating unit 34 passes over, the engaging arm 82 is made to protrude. Further, the table 73 is descended, and the engaging protrusion 81 of the cultivating unit 34 of the second stage from the bottom (the new lowest stage) is supported by the engaging arm 82. Thereby, the original lowest stage cultivating unit 34 becomes free from the cultivating unit upper than the second stage. In this state, the table 73 is furthermore descended, the wheel 79 of the lowest stage cultivating unit 34 is made to ride on the rail 80, and is made to run back and forth, making it possible to harvest the grown plants.

The cultivating unit 34 which newly becomes the lowest stage unit is taken out in a similarly way as describe above. By repeating this work, the cultivating units 34 stacked and housed in the fixed frame 78 can be sequentially taken out.

The way to stack the cultivating unit 34 in the fixed frame 78 is reverse to the way to take out described above. More specifically, on the table 73 of the lifter 71, the new cultivating unit 34 is laid and ascended, and the upper end of the support of the cultivating unit 34 is fitted to the lower end of the cultivating unit 34 of the original lowest stage. Then, the table 73 is ascended a little to release the engaging of the engaging protrusion 81 of the original lowest stage cultivating unit 34 and the engaging arm 82. And, the engaging arm 82 is pulled in, the table 73 is ascended, the engaging arm 82 is protruded when the engaging protrusion 81 of the cultivating unit 34 to be loaded passes over, the table 73 is descended to support the whole weight of the cultivating units 34 stacked by the engaging arm 82. By repeating the operation described above, the new cultivating unit 34 can be sequentially inserted into the lowest stage.

When the cultivating unit 34 is stacked as shown by a dotted line in FIG. 14, between the front and the rear panel 67, a horizontal duct is formed in the space between the containers 21 of the upper and the lower cultivating units 34. Hence, same as the case shown in FIG. 5, FIG. 6, and FIG. 8, air from the air conditioner can be supplied from the end portion of the duct, and exhausted from another end. The exhausted air may be returned to the air conditioner. In this case, if one open end of the cultivating unit 34 is opened in the fixed frame 68, same as the case of FIG. 5, the space within the fixed frame 68 can be used as an upper and a lower duct. Moreover, when it is partitioned above and below, and the air conditioner is arranged in every partition, same as the case of FIG. 1, the temperature control can be done in every stage. Further, the container 21 is of large size, the air conditioner can be provided in the end portion of the container 21 integrally, in which case, the temperature control can be done in every cultivating unit 21.

The lifter 71 of FIG. 14, FIG. 15 is fixed to the floor surface FL, but the lifter 71 itself can be made to be self-propelled. When the lifter 71 is constructed as being self-propelled, the mechanism to run the cultivating unit 34 back and forth is not necessary. Moreover, in FIG. 14, the lifter 71 is provided one each right and left, but the only one self-propelled lifter 71 may be provided.

Figure 16:
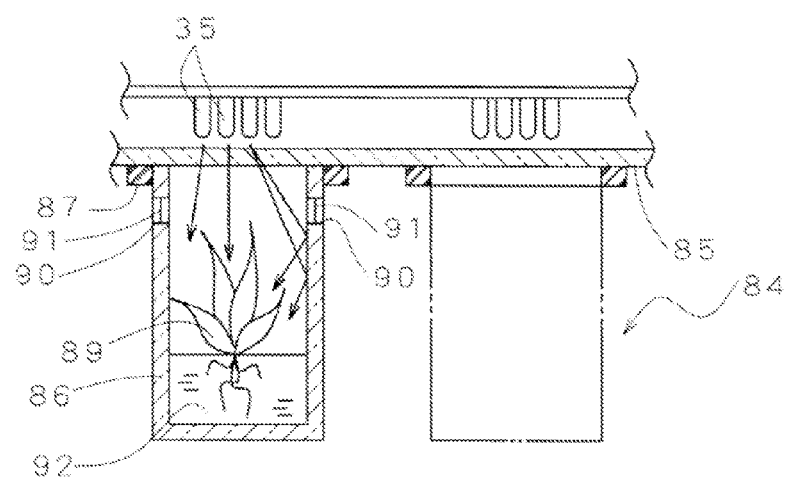
FIG. 16 is a cross sectional view showing an embodiment of the culture apparatus of the present invention.

A culture apparatus 84 shown in FIG. 16 comprises a ceiling plate or a shelf plate 85, and a container (compact container) 86 being detachable from beneath. In the lower face of the shelf plate 85, a ring like fixture 87 is provided, which fits with the upper outer perimeter or the upper inner perimeter of the compact container 86 so as to be capable of holding the container 86. The lighting fixture such as light emitting diodes 35 etc. is provided above the shelf plate 85. The shelf plate 85 or the range of the shelf plate 85 corresponding at least to the upper part of the compact container 86 is transparent, making the light of the light emitting diode 35 illuminate plants 89 such as vegetables in the container 62. The shelf plate 85 or a part thereof is composed by synthetic resin such as acrylic resin of which the transparency is high or glass. In addition, it is preferable to scatter the light by making the shelf plate 85 to be a synthetic resin plate or a figured glass, in which irregularity is provided in either of upper surface or lower surface or in both surfaces. Moreover, the shelf plate 85 is made to be transparent and a light scattering film may be intervened.

The compact container 86 is bottomed cylinder-like (cup like), and is composed of usually a transparent material, for example, acrylic resin, polyethylene, polypropylene, PET resin, polyacetal etc. However, it can be composed by non-transparent material such as metal. As the above described fixture 87, rubber such as synthetic rubber or natural rubber, or synthetic resin having elasticity, elastomer can be used. However, other detachable fixing means such as a snap coupling configuration utilizing springs etc., a double-faced adhesive tape, an adhesive, a pressure-sensitive adhesive etc. can be adopted.

Figure 17:
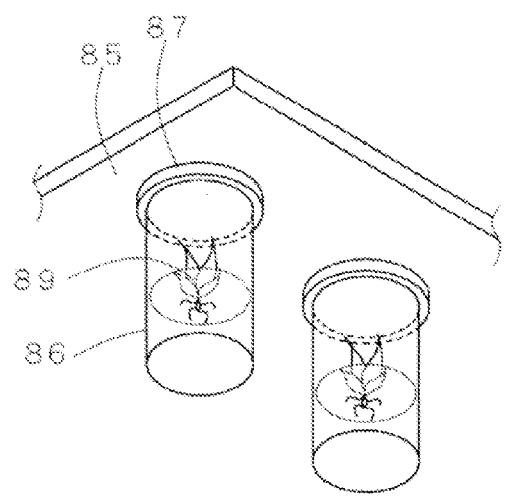
FIG. 17 is a perspective view of the culture apparatus of FIG. 16 viewed from beneath.

A culture apparatus 84 of FIG. 16 can be applied to the culture apparatus 10 of FIG. 1 etc. by fixing or attaching detachably the shelf plate 85 to the lower plane side of the container 21 of the cultivating unit 34 of FIG. 3, allowing cultivation while sending in air conditioned air. In this case, plants are not cultivated in the upper side of the container 21. When the compact container 86 is transparent, as shown in FIG. 17, it is possible to observe easily the growing condition of roots by looking up from beneath. Hence, it is suitable for cultivating root vegetables. Moreover, as shown in FIG. 16, since the distance between the plant 89 and the light emitting diode 88 is near, the light of the light emitting diode 35 can be utilized effectively. Further, since the light radiated from above to below, as shown by the arrow line, hits the inside of the container 86 with a small angle, the reflectivity is high, a part of which being reflected totally. Hence, the utility factor of the light is further high. When the container 86 is nontransparent, it is preferable to provide a reflecting layer in the inside surface, in which case the inside thereof cannot be observed, but the utilization factor of the light is high.

The supply of air, carbon dioxide to inside of the container 86 can be done by an aperture 90 provided in the upper portion of the container 86. In the aperture 90, a filter 91 to prevent the invasion of unwanted bacteria is provided. In the container 86, a culture medium 92 such as vegetable gelatin, culture solution for water culture, or soil for culture are filled previously. In the case of culture medium 92 such as vegetable gelatin, the supply of water and nutrient element is not necessary. In the case that the filter 91 is provided, the interior of the container 86 can be maintained in an aseptic condition. However, in the case of usual plants such as vegetables, it is not necessary to make it in the aseptic condition, and the filter may be not provided. In this case, a piping is passed through in the aperture 90, and the water and the culture solution may be supplied through the piping. The container 86 of FIG. 16 and FIG. 17 may be square cylinder-like other than circular cylinder-like. However, it is better for the upper end to be circular cylinder-like, because it easy to be put on and to be taken off from the fixture 87.

Figure 18A:
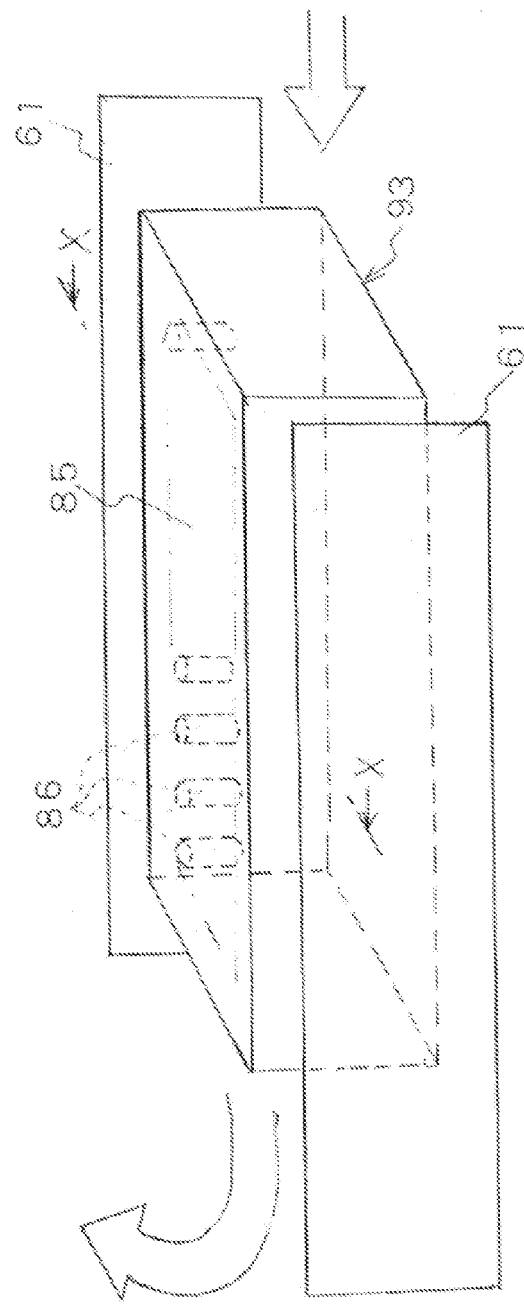
FIG. 18a is a perspective view showing further the other embodiment of the present invention.
Figure 18B:
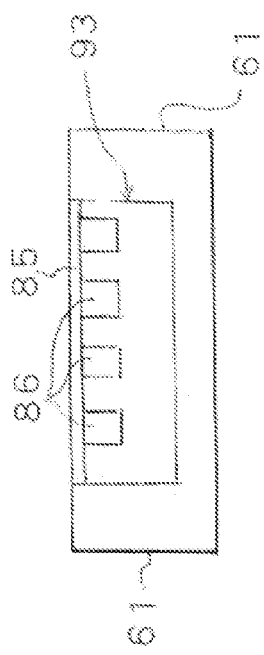

FIG. 18a and FIG. 18b show the case that the lower part of the shelf plate 85 in the culture apparatus 84 is further covered with a shelf case 93 air-tightly. The shelf case 93 is a box like case whose upper portion is opened, and it is preferable to be transparent. But it may be not transparent. Since this is further high in the air-tightness of the container 86, it can be used as a clean bench. In addition, the reference numeral 61 is a blocking wall, in the lower part of the shelf case 93 to which air conditioned air is sent in the arrow line direction, a lower stage shelf plate 85 is arranged, in the clearance of which the air is passed through. The right and the left blocking wall 61 and the shelf case 93 can be contacted without clearance.

In the embodiment described above, light emitting diodes are used as a lighting fixture, but all other lighting fixtures, for example, an electric lamp, a fluorescent lamp, a sodium lamp, a cold cathode lamp, further that in which solar light is introduced by an optical fiber etc. can be utilized. However, since the light emitting diodes have long service life, and the color of the light (wavelength) can be determined, it is possible to give a light suitable for a plant. Further, the heat release value is low compared with other lighting fixtures, if it is made close to plants, the plants are hard to be damaged.

In the unit 20 of FIG. 2 etc., the blocking sheet 24 and the blocking plate are provided in front and in rear, but it can be the unit that in which those are provided in the left side and in the rear side with its right side and front side being opened. In such a unit in which an L-shaped blocking wall in plain view is provided, for example, is arranged in the end portion or the corner portion of the culture apparatus 56 of FIG. 9, and can be used for turning around air, in which case, the turnaround chamber can be omitted.

In the embodiment described above, a plurality of cultivating units is arranged above and below, right and left, but a plurality of rows can be arranged back and forth. The planar arrangement in this case becomes a configuration shown in FIG. 1, FIG. 5, and FIG. 8. In other words, the configuration shown in FIG. 1, FIG. 5, and FIG. 8 in an elevation view is comprehended as if it is a plain view. In this case also, the air which is air conditioned by a duct composed by the cultivating unit or a horizontal duct provided separately is supplied to each cultivating unit. In addition, a plurality of cultivating units is usually provided so as to be multi stages, but it may be one stage only. Further, combining an independent cultivating unit and an air conditioner, or further combining a supply side duct or a return side duct, a culture apparatus can be composed also. That which is arranged back and forth, right and left in multi rows can be provided above and below in multi stages.

Figure 19:
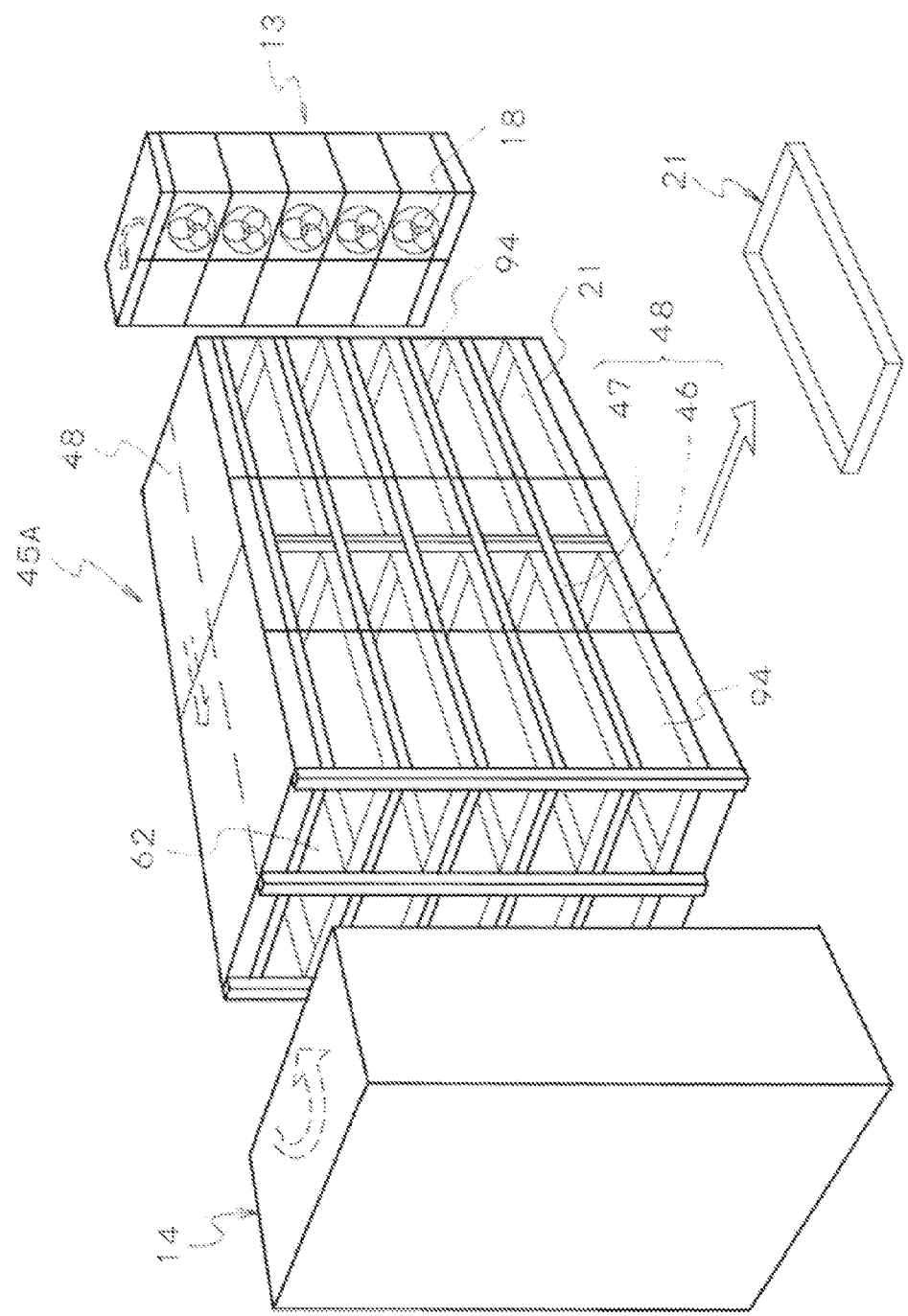
FIG. 19 is a perspective view showing further the other embodiment of the culture apparatus of the present invention.

FIG. 19 shows an illustrative embodiment of a culture apparatus in which cultivating units are arranged in two rows right and left, and in two rows back and forth. This culture apparatus 45A is that in which a dish like container (tray) 21 being shallow longitudinally is arranged in each stage of the fixed shelf 48 in the culture apparatus 45 of FIG. 6 similar to the culture apparatuses 56, 50B shown in FIG. 9 or FIG. 11b. The fixed shelf 48 is composed of a shelf frame 47 and a shelf plate 46 provided thereon. When the container 21 can be laid on the shelf frame 47, the shelf plate 46 can be omitted. In the center of the front and rear of the fixed shelf 48, a blocking wall 62 to partition the interior back and forth is provided. This blocking wall 62 is fixed to the shelf frame 47 also. Hence, in this embodiment, a freely openable and closable door 94 is provided in the front side and in the rear side of the shelf frame 47 in order to make it possible to take out the container 21 of the front side space forward, and to take out the container of rear side from the rear side. The door 94 is preferable to be a double sliding door, but it may be a flip-up door in which the upper end is coupled to the shelf frame by a hinge. The door 94 is preferable to be a transparent plate such as glass and synthetic resin etc. so that the cultivation condition is easy to be observed.

The right and left side of the fixed shelf 48 is opened, in the right side, the air conditioner (heat exchanger) and the air conditioning chamber 13 equipped with the fan 18 are arranged, In the side of the opposite side, the turnaround chamber 14 is arranged. This air conditioning chamber 13 is made so as to draw in the air of rear side space (duct) of the blocking wall 62, and to send out air conditioned air to the front side space (duct). In addition, as shown in FIG. 11b, the front and the rear space may be made merely to be mutually communicated by notching the end portion opposite to the air condition chamber 13 of the blocking wall 62. In this case, the left side of the fixed shelf 48 is plugged.

In the culture apparatus 45A composed thus and provided, the air sent out from the air conditioning chamber 13 passes through the rear side space (duct), is turned around in the turnaround chamber 14, passes through the front side space (duct), and air-conditioned again in the air conditioning chamber 13. Accordingly, since a round-trip air path is completed by one stage, compared with the culture apparatus 45 of FIG. 6, the longitudinal dimension becomes about several times compared with the culture apparatus 45 of FIG. 6, but the height can be lowered by about half. Hence, when being stacked in multi stages, the height of a building can be lowered. Further, cool air never accumulate in a lower portion, the circulation of air becomes smooth. The culture apparatus 56 of FIG. 7 and the culture apparatus 50B of FIG. 11b also have the similar merits.

In this culture apparatus 45A also, same as the case of FIG. 3, when there are not the lower face of the shelf plate of each stage, the shelf frame, or the shelf plate, a lighting fixture such as light emitting diodes, cold-cathode fluorescent lamps (HCFL), fluorescent lamps (CCFL) can be provided in the lower face of the container 21.

However, it is better to provide the lighting fixture in the shelf plate 46 and the shelf frame 47 utilizing that it is the fixed shelf 48, because the wiring is easy. Moreover, it is preferable to provide pipes for cooling which sends cold water or cold air for cooling the lighting fixture in the upper face of the shelf plate 46 and the shelf frame 47. To such pipes for cooling, it is preferable to supply cold air or cold water cooled by the heat exchanger of the air conditioning chamber 13. However, it is possible to use a separate cooler (refrigerator). Each air conditioning chamber 13 may be arranged in the right and left side of the fixed shelf 48.

As the container 21, it is preferable to be an aluminum bed formed from a material of which the thermal conductivity is high, such as aluminum. When the container 21 is made of metal such as aluminum, the aluminum bed in which soil is fed is taken out from the fixed shelf, and is disinfected easily by steam disinfection, burning disinfection to burn surfaces by a gas burner, disinfection by spraying disinfectant. However, the container 21 may be made so as not to be removable from the fixed shelf 48, in which case, the disinfection is performed with the container being left in the fixed shelf 48. Further, same as the above described case, other cultivating methods other than soil cultivation, hydroponic cultivation, vegetable gelatin cultivation can be adopted, in which case also, the steam infection etc. is easy. Moreover, planting seeds and seedlings, harvesting cultivated crops is easy. The shelf frame 47 is preferable to be made from an aluminum molded material, the blocking wall 62 is preferable to be transparent synthetic resin such as polycarbonate or glass.

Figure 20:
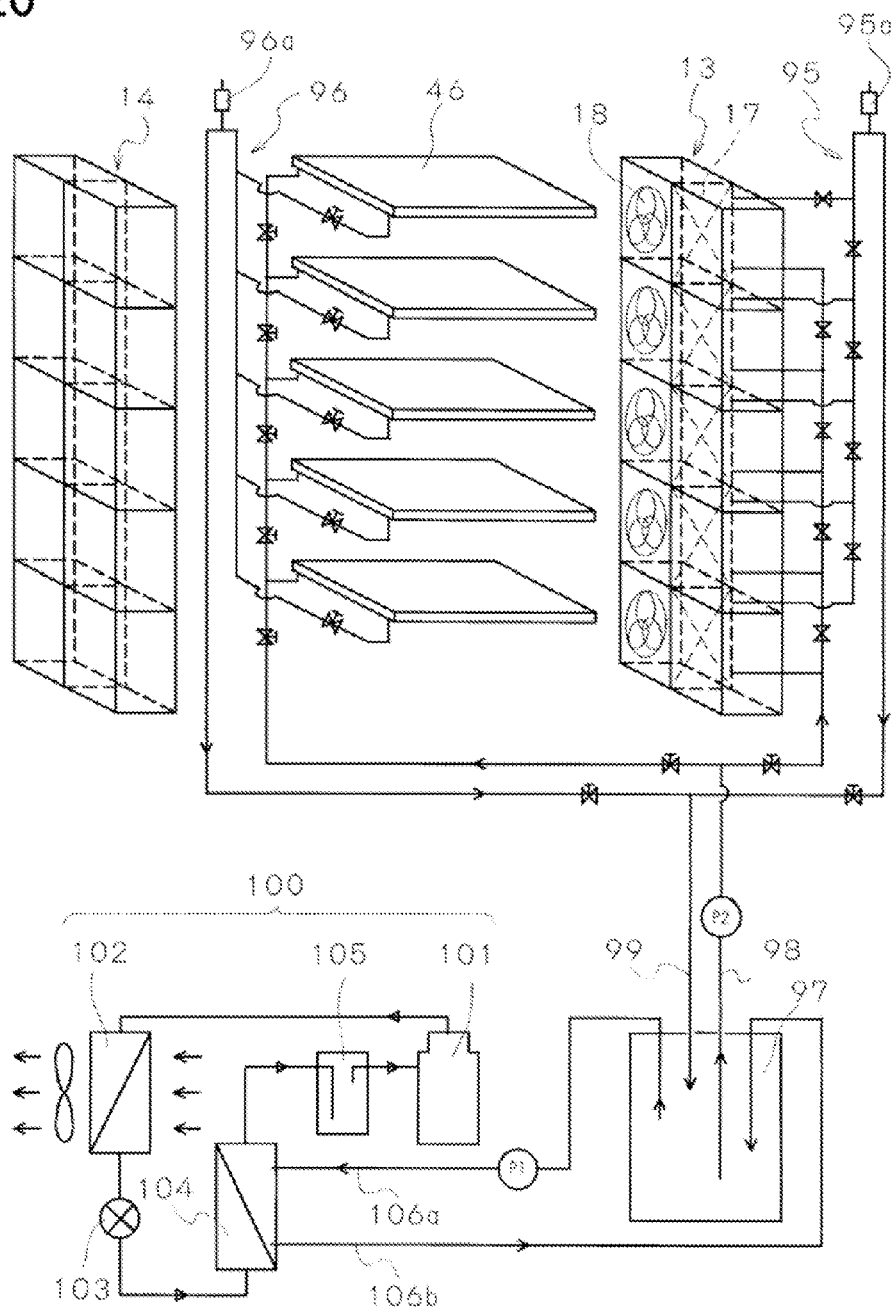
FIG. 20 is a piping system drawing showing the refrigerating cycle of the culture apparatus of FIG. 19.

FIG. 20 shows the piping system of refrigerating cycle of the culture apparatus 45A, and this piping system comprises, if roughly divided, a piping system 95 to cool the air of the air conditioning chamber 13, a piping system 96 to cool the lighting fixture provided in the lower face of the shelf plate 46, a supply pipe line 98 to supply cold water to the piping system 95, 96 from a water storage tank (cold water tank) 67 through a pump P2, a return pipe line 99 which returns water from the piping system 95, 96 to the water storage tank 97, and a common refrigerator 100 which cools the water of the water storage tank 97. The reference numerals 95a, 96a are air extractors for extracting residual air in the pipe lines.

The common refrigerator 100 comprises a compressor 101, a condenser (heat exchanger) 102 which cools a high temperature heat transfer medium coming out from the compressor by air or water (particularly well water), an evaporator (heat exchanger) 104 which evaporates the heat transfer medium (cooling medium, liquid gas) coming out from the condenser, cools the water sent by the pump 1 from the water storage tank 97 by vaporization heat at the time, a liquid accumulator 105 which condenses the evaporated heat transfer medium (cooling medium, liquid gas) coming out from the evaporator, and a closed loop pipe line which returns the liquid heat transfer medium coming out from the liquid accumulator to the compressor. The reference numeral 103 is an expansion valve intervened in the middle way of the pipe line of the heat transfer medium. In place of the expansion valve, a capillary tube can be used also. The water from the water storage tank 97 is sent to the evaporator 104 by a water supply pipe line 106a, and returned to the water storage tank 97 by a return pipe line 106b. The pump P1 is intervened in the middle way of the water supply pipe line 106a.

In the piping system of the refrigeration cycle configured as described above, the supply pipe line 98 which supplies cold water from the water storage tank 97 is branched into the piping system 95 for the air conditioning chamber 13 and the piping system 96 for lighting fixture in the middle way, and at the same time, the water returning from the piping system 95 for air conditioning chamber 13 and the piping system 96 for lighting fixture is joined together and returned to the water storage tank 97 by a return piping path 99. However, each piping system 95, 96 may be piped separately to the water storage tank 97, in which case, a pump 2 becomes necessary in each piping system 95, 96. Further, other than these parallel piping line configuration, it is also possible to make a series pipe line configuration, in which the water returned after cooling in any one piping system among the piping system 95, 96 for air conditioning chamber 13 or for lighting fixture is further made to flow in another piping system, and returned to the water storage tank 97. In each case, the refrigerator to cool interior of the duct and the refrigerator to cool the lighting fixture such as light emitting diodes are made to be common, saving the equipment simplifying the pipe line.

Moreover, in the pipe line configuration of FIG. 20, since the refrigerator 100 and the piping system 95, 96 of the air conditioning chamber 13 and the lighting fixture are not directly coupled, and are coupled through the water storage tank 97, if the water of the piping system 95, 96 is lost by evaporation etc. it never become deficient. However, the refrigerator 100 and the piping system 95, 96 of the air conditioning chamber 13 and the lighting fixture can be directly coupled. Further, in the case that the cooling temperature of the lighting fixture and the temperature of the duct is desired to be changed, the refrigerator to cool the lighting fixture and the refrigerator to cool the air conditioning chamber 13 can be made separate.

Figure 21A:
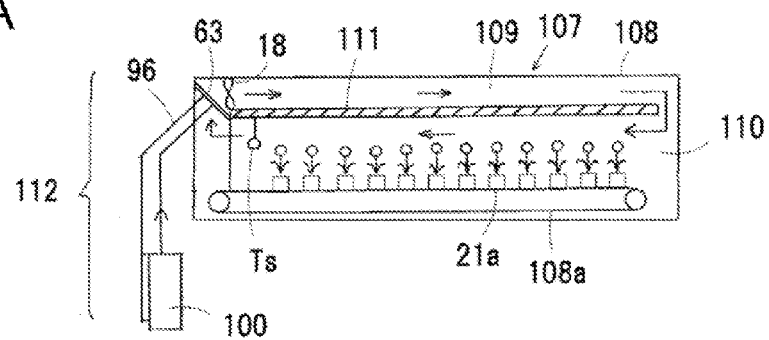
FIG. 21a and FIG. 21b are a front elevation view showing further the other embodiment of the culture apparatus of the present invention.

FIG. 21a shows an air conditioning circuit for one shelf of the multi stage culture apparatus 107. This culture apparatus 107 has the configuration fundamentally same as the culture apparatus 45 of FIG. 6 or the culture apparatus 50 of FIG. 8, and comprises a box body 108 composed of a heat insulating wall of which the whole of front and rear, right and left, upper and lower faces exerts a heat insulating action, a conveyer 108a as a shifting device housed in the box body, many containers 21 arranged on the conveyer 108a, in which soil for plant cultivation etc. is let in, a roughly plate-like or a thin box-like light emitting panel 111 arranged in the upper part of the box body 108 with a clearance (upper circulation path) 109 in between the ceiling, doubling as a partition in between a lower space (lower circulation path) 110, and a refrigerator 112 which cools the lighting fixture via air passed through in the upper circulation path. When being made to be a stacked type as shown in FIG. 2, the upper face of the box body 108 may be not closed. The light emitting panel 111 is a lighting fixture which doubles as a heating fixture or a warming fixture. In the box body 108, an inlet port to let in the container 21 in which the seedling of plants are planted, and an outlet port to take out the grown plants are provided. In the inlet port and the outlet port, a freely openable and closable door is provided. As the conveyer 108a, various conveyers such as a belt conveyer, a chain conveyer, a roller conveyer can be adopted. The shift of the conveyer can also be made to be an intermittent motion of about one time per day. Further, as a shifter to shift the container 21 in the box body 108, other than the conveyers such as a crane can be adopted. On the other hand, the shifter such as the conveyer 108a may be not adopted.

The refrigerator 112 is roughly similar to that which is shown in FIG. 11, and is equipped with the upper circulation path 109 equivalent to a return duct, the heat exchanger 63 provided at one end side of the box body 108 so as to block between the upper and the lower circulation path 109, 11.0, the fan 18 which circulates air in the circulation path, the piping system 96 to cool air by flowing a cooling medium in the heat exchanger 63 in order to heat-exchange with air, and a refrigerator (chiller) 100 to cool the returning cooling medium. The conveyer 108a is not adopted. Further, a temperature sensor Ts which detects the temperature of air in the lower circulation path is equipped, and a control device which controls ON/OFF of the refrigerator 100 according to the output of the temperature sensor Ts is provided. More specifically, when the temperature sensor Ts detects the temperature lower than a predetermined reference temperature, since the temperature of the lower circulation path 110 is too low, the power source of the refrigerator 100 is turned off, and heating (warming) is done by the light emitting panel 111. When the temperature rises, the power source of the refrigerator 100 is turned on to cool air. In addition, when the air of the lower circulation path 110 becomes too low, the fan 18 may be stopped. But, if the circulation of the air is continued by continuing the rotation of the fan 18, there is a merit that whole temperature can be measured. It is preferable to adjust the air temperature so as not to become below the dew-point temperature. Thereby, dew condensation within the blocking wall is prevented. And, by the conveyer 108a, the container 21 is shifted, the container 21 in which seedlings are planted is let in from the inlet port, and the grown plants can be taken out from the outlet port, Hence, efficient cultivation can be carried out.

Figure 21B:
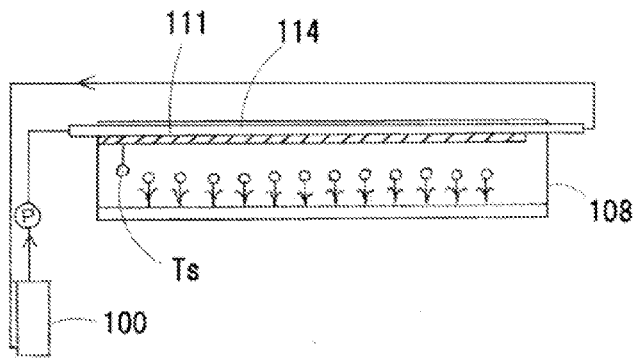

In the culture apparatus 107 of FIG. 21a, the light emitting panel 111 is cooled by a cooler 112, as sort of air-cooling type, but it may be cooled by a water cooling type, such as a culture apparatus 113 shown in FIG. 21b. In this culture apparatus 113, the heat exchanger 18 is not used, and the water coming out from the refrigerator 100 is passed through to a pipe 114 for cooling provided in the upper face of the light emitting panel 111 via the pump P and the piping system 96. The box body 108 surrounding six planes with the heat insulating wall, the light emitting panel 111, the temperature sensor Ts, the control device etc, are same as those of the culture apparatus 107 of FIG. 21a. In addition, in the culture apparatus 113 of FIG. 21b also, the conveyer 108a can be adopted similar to the culture apparatus 107 of FIG. 21a. Moreover, in the culture apparatus 107 of FIG. 21a also, the cooling medium may be circulated by providing the pump P similar to FIG. 21b.

Moreover, as a cooling means of the light emitting panel 111, the air-cooling type cooler 112 of FIG. 21a, and a water cooling type cooler of FIG. 21b are used singly respectively, but other than this, the both coolers can be used simultaneously, moreover in a cold district, it is possible not to use the refrigerator 100, but to cool water by a cooling tower, which is better for energy saving. In the case of air-cooling type, to enhance the air cooling effect, a heat radiating plate composed of a metal plate of high thermal conductivity or a ceramic plate on the upper face of the light emitting panel 111 is preferable to be used, and at the same time, it is preferable to provide many fins. The air-cooling type cooler 112 of FIG. 121a coupled by the pipe line 96 and water-cooling type cooler of FIG. 12b can be adopted singly respectively or can be adopted in combination in any of culture apparatus of FIG. 1, FIG. 6, FIG. 9 etc.

Figure 22:
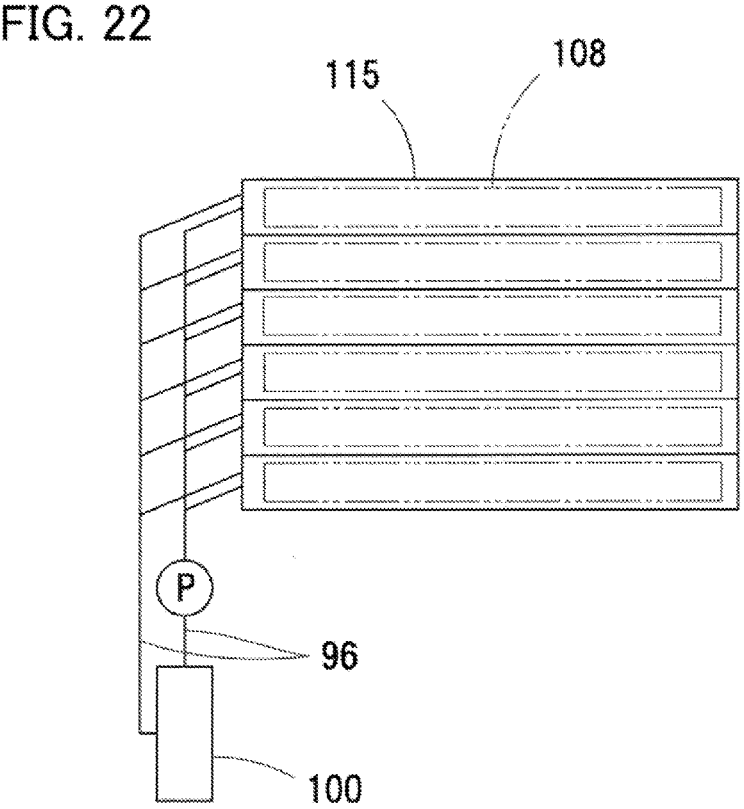
FIG. 22 is a front elevation view showing further the other embodiment of the culture apparatus of the present invention.

The culture apparatus of FIG. 21a, FIG. 21b are both shown in one stage (one shelf), but it is preferable to provide the cultivating unit in the fixed shelf 115 shown in FIG. 22 in multi stages. In this case, same as the case of FIG. 20, the piping 96 from the refrigerator 100 is coupled to the culture apparatus 107 or 113 of each shelf. In this case, by every shelf or by every box body 108, different crops can be cultivated also, in which case, an electromagnetic valve is provided in the piping 96 branched into each shelf (refer to FIG. 20). By turning on/off the electromagnetic valve, and further, turning on/off the operation of the fan 18 for circulation, it is possible to control temperature so as to be a different temperature by every shelf and box body, changing a target temperature.
In addition, it is possible to control temperature to be an individual temperature by making the piping coming out from the refrigerator 100 to be a plurality of systems, and by turning on/off the pump P provided in each system.

As the light emitting body of the light emitting panel, a light emitting diode (LED), various light emitting bodies such as a fluorescent lamp, a cold cathode fluorescent lamp (CCFL), a hot cathode fluorescent lamp (HCFL), a metal haloid lamp, a high pressure sodium lamp, an organic electroluminescence (organic EL) device, an incandescent lamp can be used according to the kind of plants to be cultivated. When the function as a heat source is strongly desired, an incandescent lamp is preferable, and when the color (wavelength) of light is desired to be uniform, the light emitting diode is preferable.

Secondly, the light emitting panel usable for the culture apparatus 107 of FIG. 21a is described. These are most preferable to be used for the culture apparatus of the present invention, but it may be used for other culture apparatuses.

Figure 23A:
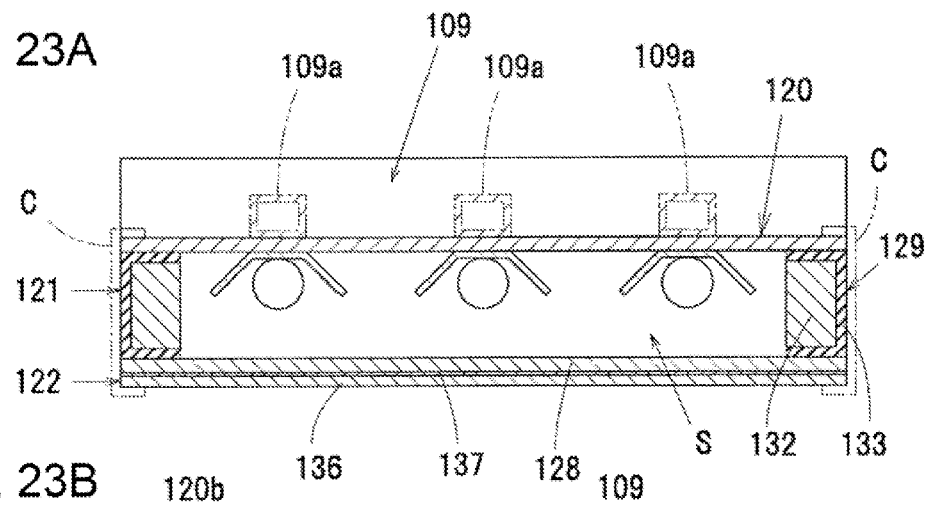
FIG. 23a-c are respectively side cross sectional views of the light emitting panel which can be used in the culture apparatus of the present invention.

The light emitting panel 120 of FIG. 23a comprises a light emitting box 121 and a fluorescent plate 122 attached detachably to the light emitting box. Moreover, the rear of the light emitting panel is an upper circulation path 109.

The light emitting box 121 is that which is box-shaped, and comprises a heat radiating plate 126, a light emitting portion 127 provided thereon contactingly, an ultraviolet ray-transmissive transparent plate 128 provided spaced apart from the heat radiating plate with a space S, and a sealing body 129 which seals the space between the heat radiating plate 126 and the transparent plate 128. Stated differently, the light emitting body 127 is closed water-tightly and air-tightly by the heat radiating plate 126, the transparent body 128, and the sealing body 129. The interior of the light emitting box 121 is filled with dry air and/or inert gas such as nitrogen. Further, since the interior of the plant culture apparatus is high temperature and humidity, a desiccant agent or a deoxidizer is preferable to be filled in.

The heat radiating plate 126 is formed of a metal plate, particularly an aluminum plate, and directly contacts the light emitting portion 127. Since it is formed of a metal plate and contacts the light emitting portion 127, it can cool the light emitting portion 127 by cold air flowing in the upper circulation path 109. Moreover, by being formed from an aluminum plate, the weight saving of the whole of the light emitting panel can be actualized.

The light emitting portion 127 comprises a reflecting plate 130 and a light emitting body 131 (cold cathode fluorescent tube or hot cathode fluorescent tube) provided on the reflecting plate, emitting ultraviolet rays. This light emitting portion 127 is arranged in line in the light emitting box (front and rear direction of FIG. 23a).

As a light transmitting body 128, quartz glass can be cited.

The sealing body 129 comprises, for example, a frame member 132, and a sealing material 133 provided around thereof. As the frame member 132, that which is square pipe shaped in which a metal thin plate is folded to be C-shaped in cross section or rectangular in cross section, or square shaped pillar or square shaped pipe made of synthetic resin can be cited. As a sealing material 133, silicon sealant, rubber, synthetic resin elastomer etc. can be cited. When the frame member 132 is made into square shaped one, it is preferable to make the interior and the space S coupled mutually, and a desiccant agent or a deoxidizer is preferable to be filled in the interior. However, as the sealing body 129, it is not particularly limited thereto as far as it seals between the heat radiating plate 126 and the translucent plate 128 air-tightly, water tightly.

The fluorescent plate 122 comprises a translucent portion 136 and a fluorescent layer 137 provided on the surface thereof. As the translucent portion 136, quartz glass can be cited. Moreover, as the fluorescent layer 137, fluorescent material coated on the fluorescent layer 137 can be cited. Such a fluorescent plate 122 is, for example, fixed detachably by a clip C which clips the light emitting panel 121 and the fluorescent palate 122 as shown in the imaginary line.

In this light emitting panel 120, since the interior of the light emitting box 121 is maintained to be in a dry condition or an oxygen-free condition, durability is high, even under the humid environment such as the culture apparatus. Moreover, since the fluorescent plate 122 is made to be detachable, by preparing a plurality of fluorescent plates 122 in which different fluorescent coating is provided, arbitrary visible lights can be illuminated to the plants according to the kind, growth state of the plants.

Thus, since the illumination light can be changed without replacing the body of the light emitting panel 120, the work can be carried out efficiently.

Moreover, since the replacement of the fluorescent plate 122 can be done outside of the light emitting box without opening the light emitting box 121, the durability is maintained.

Further, since in the light emitting panel 120, the light emitting portion 127 which is a heat source, further, the interior of the light emitting panel 120 can be cooled efficiently by the pipe 123, the temperature control of the interior of the culture apparatus can be performed simply under the management of the temperature sensor.

Moreover, the upper circulation path 109 may be a pipe 109a shown by the imaginary line. This pipe 109a is contactingly provided in the rear of the heat radiating plate 126 of the light emitting panel. This pipe 109a is preferable to be provided linearly in parallel to the light emitting portion 127, and to be located in the same position as the reflecting plate 130. With this configuration, by letting a cooling medium through the pipe 109a, the light emitting portion 127 is efficiently cooled.

Figure 23B:
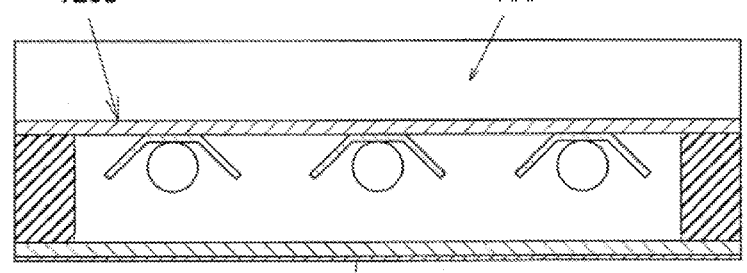

The light emitting panel 120b of FIG. 23b is that in which a fluorescent coating P is directly provided in the outer surface or the inner surface of the light emitting box of FIG. 23a. It is impossible for this to change the irradiation light without removing the light emitting panel compared with FIG. 22a. But it is suitable for temperature adjustment etc. of the interior of the culture apparatus.

Figure 23C:
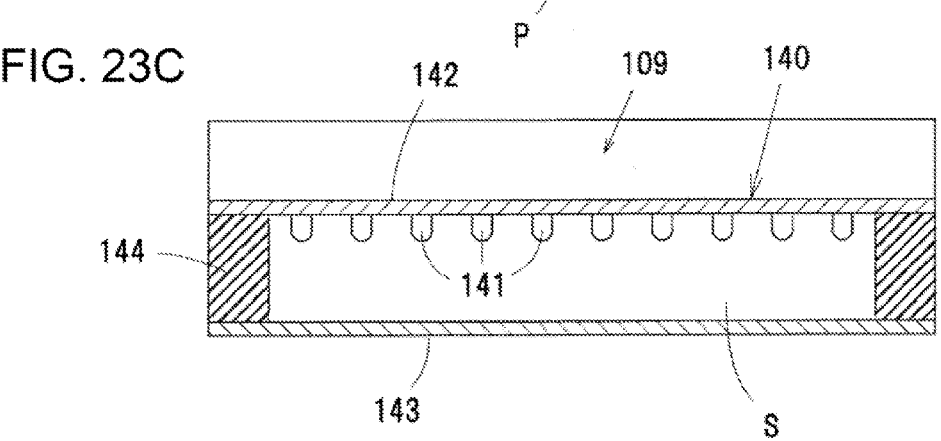

The light emitting panel 140 of FIG. 23c is that in which a light emitting diode 141 is used as a light emitting body. This light emitting panel 140 has a heat radiating plate 142, a translucent body 143, and a sealing body 144, the space S of the light emitting panel 140 is filled with dry air or inner air. Further, a desiccant and/or a deoxidizer can be filled. The heat radiating panel 142, the sealing body 144 are substantially same as the heat radiating panel 126, the sealing body 128 of FIG. 23a respectively. The translucent body 143 may be that which is translucent.

What is claimed is:

1. A plant culture apparatus, comprising;
a box body composed of a heat insulating wall of which the whole of front and rear, right and left, upper and lower faces exerts a heat insulating action,
a light emitting panel arranged in the upper part of the box body with a clearance of an upper circulation path in between a ceiling, and dividing the clearance with a lower circulation path of a plant cultivation space, in which the upper circulation path and the lower circulation path is communicated at one end, and
a refrigerator which supplies a cooling air cooling the light emitting panel from the other end of the upper circulation path.

2. A plant culture apparatus according to claim 1,
wherein the lower circulation path of the plant cultivation space and the upper circulation path are provided in multi stages above and below.

3. A plant culture apparatus according to claim 2,
further comprising a control device which control a temperature of the lower circulation path,
wherein the control device has a temperature sensor detecting the temperature of the lower circulation path,
which actuates the refrigerator and cools the plant cultivation space when the temperature sensor detect a temperature lower than a predetermined reference temperature, and which stops the refrigerator and warms the plant cultivation space when the temperature sensor detect a temperature higher than a predetermined reference temperature.

4. A plant culture apparatus according to claim 2,
wherein the refrigerator has a heat exchanger provided so as to block between the upper circulation path and the lower circulation path, a fan which circulates air to the upper circulation path, a piping system to flow a cooling medium into the heat exchanger, and a chiller to cool the returning cooling medium.

5. A plant culture apparatus according to claim 2,
further comprising a conveyor for shifting a container in the box body in the plant cultivation space.

6. A plant culture apparatus according to claim 2,
wherein the light emitting panel has a heat radiating plate made of metal, a light emitting portion contactingly provided on the heat radiating plate, an ultraviolet ray-transmissive transparent plate provided apart from the heat radiating plate with a space, and a sealing body which seals the space between the heat radiating plate and the transparent plate.

7. A plant culture apparatus according to claim 2,
wherein the box body is a fixed shelf, and the refrigerator is arranged at a conditioning chamber fixed at one end of the fixed shelf.

\* \* \* \* \*